United States Patent
Fulmer et al.

(10) Patent No.: US 9,972,140 B1
(45) Date of Patent: May 15, 2018

(54) CONSUMER PRODUCT ADVERTISING IMAGE GENERATION SYSTEM AND METHOD

(71) Applicant: Southern Graphics Inc., Louisville, KY (US)

(72) Inventors: Damian M. Fulmer, Royal Oak, MI (US); Drew Loveridge, Roseville, MI (US)

(*) Notice: Subject to any disclaimer, the term of this patent is extended or adjusted under 35 U.S.C. 154(b) by 0 days. days.

(21) Appl. No.: 15/352,344

(22) Filed: Nov. 15, 2016

(51) Int. Cl.
| | | |
|---|---|---|
| *G06T 19/20* | (2011.01) | |
| *G06T 15/20* | (2011.01) | |
| *G06T 15/00* | (2011.01) | |
| *G06T 15/80* | (2011.01) | |
| *G06T 17/00* | (2006.01) | |

(52) U.S. Cl.
CPC ............ *G06T 19/20* (2013.01); *G06T 15/005* (2013.01); *G06T 15/20* (2013.01); *G06T 15/80* (2013.01); *G06T 17/00* (2013.01); *G06T 2200/24* (2013.01)

(58) Field of Classification Search
None
See application file for complete search history.

(56) References Cited

U.S. PATENT DOCUMENTS

| | | |
|---|---|---|
| 2011/0057929 A1 | 3/2011 | Chen et al. |
| 2013/0278600 A1 | 10/2013 | Christensen et al. |
| 2014/0150013 A1 | 5/2014 | Fauqueur et al. |
| 2016/0147912 A1 | 5/2016 | Bergin et al. |
| 2017/0061700 A1* | 3/2017 | Urbach .................. G06F 3/011 |

FOREIGN PATENT DOCUMENTS

EP    2996086 A1    3/2016

OTHER PUBLICATIONS

PCT International Searching Authority, International Search Report and Written Opinion dated Feb. 19, 2018, 13 pages.

* cited by examiner

*Primary Examiner* — Michelle Chin
(74) *Attorney, Agent, or Firm* — Merchant & Gould P.C.

(57) ABSTRACT

A method of generating a three-dimensional consumer product image includes: distilling one or more objects of a three-dimensional model of a consumer product to corresponding three-dimensional geometric representations; applying a visual attribute to the geometric representations of the objects; rendering a plurality of two dimensional images from the geometric representations of the objects with applied visual attributes; defining one or more stacking orders of at least a portion of the plurality of two dimensional images; and delivering to a user the two-dimensional images and the defined stacking orders in a form that is importable into a computer-executable image editing program, the computer-executable image editing program capable of enabling user selection of one or more of the defined stacking orders and capable of producing a three-dimensional image of at least a portion of the consumer product based on the user-selected one or more defined stacking orders and the imported two-dimensional images.

21 Claims, 28 Drawing Sheets

FIG. 8 (Cont.)

| | Frame #1 | Frame #2 | Frame #3 | Frame #4 | Frame #5 | Frame #6 | Frame #7 | Frame #8 | Frame #9 | Frame #10 | Frame #11 | Frame #12 |
|---|---|---|---|---|---|---|---|---|---|---|---|---|
| FRONT_FASCIA_sport | 15 | 15 | 15 | 15 | 15 | 15 | 15 | 15 | 0 | 0 | 0 | 0 |
| FRONT_FASCIA_standard | 15 | 15 | 15 | 15 | 15 | 15 | 15 | 15 | 0 | 0 | 0 | 0 |
| FRONT_GRILLE_camera_equipped | 15 | 15 | 15 | 15 | 15 | 15 | 15 | 15 | 0 | 0 | 0 | 0 |
| FRONT_GRILLE_camera_not_available | 15 | 15 | 15 | 15 | 15 | 15 | 15 | 15 | 0 | 0 | 0 | 0 |
| HEADLIGHT_WASHERS | 15 | 15 | 15 | 15 | 15 | 15 | 15 | 15 | 0 | 0 | 0 | 0 |
| LOWER_GRILLE_sport_fascia_icc_equipped | 15 | 15 | 15 | 15 | 15 | 15 | 15 | 15 | 0 | 0 | 0 | 0 |
| LOWER_GRILLE_sport_fascia_icc_not_available | 15 | 15 | 15 | 15 | 15 | 15 | 15 | 15 | 0 | 0 | 0 | 0 |
| LOWER_GRILLE_standard_fascia_icc_equipped | 3 | 3 | 3 | 3 | 3 | 3 | 3 | 3 | 0 | 0 | 0 | 0 |
| LOWER_GRILLE_standard_fascia_icc_not_available | 3 | 3 | 3 | 3 | 3 | 3 | 3 | 3 | 0 | 0 | 0 | 0 |
| LOWER_GRILLE_GCC_TWN_PRC | 3 | 3 | 3 | 3 | 3 | 3 | 3 | 3 | 0 | 0 | 0 | 0 |
| PLATE_EURO_TYPE | 15 | 15 | 15 | 15 | 15 | 15 | 15 | 15 | 0 | 0 | 0 | 0 |
| PLATE_TWN | 15 | 15 | 15 | 15 | 15 | 15 | 15 | 15 | 0 | 0 | 0 | 0 |
| PLATE_US | 15 | 15 | 15 | 15 | 15 | 15 | 15 | 15 | 0 | 0 | 0 | 0 |
| ROOF_moonroof_equipped | 15 | 15 | 15 | 15 | 15 | 15 | 15 | 15 | 0 | 0 | 0 | 0 |
| ROOF_moonroof_not_available | 15 | 15 | 15 | 15 | 15 | 15 | 15 | 15 | 0 | 0 | 0 | 0 |
| RR_COMB_LH_LENS_US | 15 | 15 | 15 | 15 | 15 | 15 | 15 | 15 | 0 | 0 | 0 | 0 |
| RR_COMB_LENS_EUR | 15 | 15 | 15 | 15 | 15 | 15 | 15 | 15 | 0 | 0 | 0 | 0 |

FIG. 12

| | | | | | | | | | | | | | | | | |
|---|---|---|---|---|---|---|---|---|---|---|---|---|---|---|---|---|
| SIDE_VIEW_MIRRORS_w camera_RHD | 15 | 15 | 15 | 15 | 15 | 15 | 15 | 15 | | 0 | 0 | 0 | 0 | 0 | | |
| SIDE_VIEW_MIRRORS_wo camera_RHD | 15 | 15 | 15 | 15 | 15 | 15 | 15 | 15 | | 0 | 0 | 0 | 0 | 0 | | |
| SIDE_VIEW_MIRRORS_w camera_LHD | 15 | 15 | 15 | 15 | 15 | 15 | 15 | 15 | | 0 | 0 | 0 | 0 | 0 | | |
| SIDE_VIEW_MIRRORS_wo camera_LHD | 15 | 15 | 15 | 15 | 15 | 15 | 15 | 15 | | 0 | 0 | 0 | 0 | 0 | | |
| SONAR_FRONT_FASCIA_sport | 15 | 15 | 15 | 15 | 15 | 15 | 15 | 15 | | 0 | 0 | 0 | 0 | 0 | | |
| SONAR_FRONT_FASCIA_standard | 15 | 15 | 15 | 15 | 15 | 15 | 15 | 15 | | 0 | 0 | 0 | 0 | 0 | | |
| SONAR_REAR_FASCIA | 15 | 15 | 15 | 15 | 15 | 15 | 15 | 15 | | 0 | 0 | 0 | 0 | 0 | | |
| WIPERS_LHD_STD | 15 | 15 | 15 | 15 | 15 | 15 | 15 | 15 | | 0 | 0 | 0 | 0 | 0 | | |
| WIPERS_LHD_DEICER | 15 | 15 | 15 | 15 | 15 | 15 | 15 | 15 | | 0 | 0 | 0 | 0 | 0 | | |
| WIPERS_RHD_STD | 15 | 15 | 15 | 15 | 15 | 15 | 15 | 15 | | 0 | 0 | 0 | 0 | 0 | | |
| Shadow_Sport | 29 | 29 | 29 | 29 | 29 | 29 | 29 | 29 | | 0 | 0 | 0 | 0 | 0 | | |
| Shadow_Std | 29 | 29 | 29 | 29 | 29 | 29 | 29 | 29 | | 0 | 0 | 0 | 0 | 0 | | |
| WHEELS_17 inch_ACCY_SPORT_REF | 30 | 30 | 30 | 30 | 30 | 30 | 30 | 30 | | 0 | 0 | 0 | 0 | 0 | | |
| WHEELS_17 inch_ACCY_STD_REF | 30 | 30 | 30 | 30 | 30 | 30 | 30 | 30 | | 0 | 0 | 0 | 0 | 0 | | |
| WHEELS_17 inch_EUR_SPORT_REF | 30 | 30 | 30 | 30 | 30 | 30 | 30 | 30 | | 0 | 0 | 0 | 0 | 0 | | |
| WHEELS_17 inch_EUR_STD_REF | 30 | 30 | 30 | 30 | 30 | 30 | 30 | 30 | | 0 | 0 | 0 | 0 | 0 | | |
| WHEELS_17 inch_SPORT_REF | 30 | 30 | 30 | 30 | 30 | 30 | 30 | 30 | | 0 | 0 | 0 | 0 | 0 | | |
| WHEELS_17 inch_STD_REF | 30 | 30 | 30 | 30 | 30 | 30 | 30 | 30 | | 0 | 0 | 0 | 0 | 0 | | |
| WHEELS_18 inch_EUR_SPORT_REF | 30 | 30 | 30 | 30 | 30 | 30 | 30 | 30 | | 0 | 0 | 0 | 0 | 0 | | |
| WHEELS_18 inch_EUR_STD_REF | 30 | 30 | 30 | 30 | 30 | 30 | 30 | 30 | | 0 | 0 | 0 | 0 | 0 | | |
| WHEELS_19 inch_ACCY_SPORT_REF | 30 | 30 | 30 | 30 | 30 | 30 | 30 | 30 | | 0 | 0 | 0 | 0 | 0 | | |

Trims | Config Parts | Config Images | Asset Creation | Asset Deletion
Trim Build Assignment | Attribute Assignments | Scans And Checks | Frame Stacking Order Drag And Drop Painted Config Image Assignments

Painted Config Images — 1402

- COMMON_LHD
- DOOR_HANDLE_FR_w_IKEY_LHD
- DOOR_HANDLE_FR_wo_IKEY_LHD
- DOOR_HANDLE_FR_w_IKEY_RHD
- DOOR_HANDLE_FR_wo_IKEY_RHD
- DOOR_HANDLES_RR_IKEY
- DOOR_HANDLES_RR_wo_IKEY
- FRONT_FASCIA_sport
- FRONT_FASCIA_standard
- HEADLIGHT_WASHERS
- PLATE_EURO_TYPE
- PLATE_TWN
- PLATE_US
- ROOF_moonroof_equipped
- ROOF_moonroof_not_available
- SONAR_FRONT_FASCIA_sport
- SONAR_FRONT_FASCIA_standard
- SONAR_REAR_FASCIA
- WHEELS_17_inch_ACCY_SPORT_REF
- WHEELS_17_inch_ACCY_STD_REF
- WHEELS_17_inch_EUR_SPORT_REF
- WHEELS_17_inch_EUR_STD_REF
- WHEELS_17_inch_SPORT_REF
- WHEELS_17_inch_STD_REF
- WHEELS_18_inch_EUR_SPORT_REF

Non Painted Config Images — 1404

- BADGE_AWD
- BADGE_2_0t
- BADGE_2_2d
- BADGE_Q50
- BADGE_Q50S_blue
- BADGE_Q50S_red
- BADGE_3_7
- BADGES_HYBRID
- FOG_LAMPS_wo
- FOG_LAMPS_STD
- FOG_LAMPS_Sport
- FRONT_GRILLE_camera_equipped
- FRONT_GRILLE_camera_not_available
- LOWER_GRILLE_sport_fascia_icc_equipped
- LOWER_GRILLE_sport_fascia_icc_not_available
- LOWER_GRILLE_standard_fascia_icc_equipped
- LOWER_GRILLE_standard_fascia_icc_not_available
- LOWER_GRILLE_GCC_TWN_PRC
- RR_COMB_LH_LENS_US
- RR_COMB_LENS_EUR
- SIDE_VIEW_MIRRORS_w_camera_RHD
- SIDE_VIEW_MIRRORS_wo_camera_RHD
- SIDE_VIEW_MIRRORS_w_camera_LHD
- SIDE_VIEW_MIRRORS_wo_camera_LHD
- WIPERS_LHD_DEICER
- WIPERS_RHD_STD

File | Global Functions
Trims | Config Parts | Config Images | Asset Creation | Asset Deletion
Config Part To Trim Build Assinment | Painted Config Parts Assinment | Finished Config Part Assinments

Finished Config Parts
- CENTER_CONSOLE_AUTO
- CTR_CLUSTER_RADIO_BEZEL_HIGH
- CTR_CLUSTER_RADIO_BEZEL_LOW
- COMMON_LHD
- COMMON_RHD
- DOOR_TRIM_LHD_W_SEAT_MEMORY
- DOOR_TRIM_LH_SIDE_W_OUT_SEAT_MEMORY

1602

Non Finished Config Parts
- AUDIO_HVAC_1UF1A
- AUDIO_HVAC_1BU8A_1UF3A
- AUDIO_HVAC_JL43C
- AUDIO_HVAC_1VW4A
- AUDIO_HVAC_JJ92A
- AUDIO_HVAC_JJ94A
- CENTER_CONSOLE_FINISHER_W_AUX
- CENTER_CONSOLE_AUTO_VTR_MASK
- CENTER_CONSOLE_AUTO_VTR
- CTR_CONSOLE_MANUAL_CUP_HOLDER
- CTR_CONSOLE_MANUAL_VTR_MASK
- CTR_CNSL_AC_SEATS_AUTO_TRANS
- CTR_CNSL_HEATED_SEATS_AUTO_TRANS
- CTR_CONSOLE_MANUAL
- CTR_CONSOLE_FINISHERS_AUTO_STD_Aluminum
- CTR_CONSOLE_FINISHERS_AUTO_STD_Wood
- COMMON_ALL
- DASH_LWR_BOLSTER_LHD_OTHER_COUNTRIES
- DASH_LWR_BOLSTER_LHD_US
- DASH_LWR_BUTTON_REAR_SONAR
- DASH_LWR_MASK_AFS_US_ONLY
- DASH_LWR_SW_HDLMP_CLEANER
- DASH_LWR_SW_MASK
- DASH_LWR_SW_OCCUPNT_EURO

```
<trim>
  <name>Sedan|3.7 Liter|RWD|LH Drive|Premium|7AT | Q50 |EG| US|Std Equipment|NAVI5|[BLSALVLV37EUA---C-]</name>
  <Option_Sets>
    <Option_Set>CAN</Option_Set>
    <Option_Set>GAC</Option_Set>
    <Option_Set>K23</Option_Set>
    <Option_Set>KAD</Option_Set>
    <Option_Set>KH3</Option_Set>
    <Option_Set>NAH</Option_Set>
    <Option_Set>QAA</Option_Set>
    <Option_Set>RBP</Option_Set>
  </Option_Sets>
  <layers>_COMMON_LHD</layers>
  <layers>_BADGE_Q50</layers>
  <layers>_BADGE_3_7</layers>
  <layers>_DOOR_HANDLE_FR_w_IKEY_LHD</layers>
  <layers>_DOOR_HANDLE_RR_wo_IKEY</layers>
  <layers>_FOG_LAMPS_STD</layers>
  <layers>_FRONT_FASCIA_standard</layers>
  <layers>_FRONT_GRILLE_camera_not_available</layers>
  <layers>_LOWER_GRILLE_standard_fascia_icc_not_available</layers>
  <layers>_PLATE_US</layers>
  <layers>_ROOF_MOONROOF_equipped</layers>
  <layers>_RR_COMB_LH_LENS_US</layers>
  <layers>_SIDE_VIEW_MIRRORS_wo_camera_LHD</layers>
  <layers>_WIPERS_LHD_STD</layers>
  <layers>_Shadow_Std</layers>
  <layers>_WHEELS_17_inch_STD_REF</layers>
  <layers>_HEADLAMP_w_LEDS_US</layers>
  <layers>_RR_WINDOW_w_DEFROST_LHD</layers>
  <layers>_FRIT_wo_CAMERA_4GA0A_LHD</layers>
  <layers>_WHEELS_17_inch_STD</layers>
  <layers>_ANTENNA_</layers>
<trim>
```

FIG. 18

CONSUMER PRODUCT ADVERTISING IMAGE GENERATION SYSTEM AND METHOD

BACKGROUND

Since the advent of photography consumer product advertising images have been generated through the use of film and camera. Modern times have seen consumer product images advance to being captured with a digital cameras. Whether the consumer product advertising images are captured digitally or by film, hours and hours of time are spent positioning a product with just the right lighting to produce an advertising-worthy photo than can be used in magazines or on billboards. In some cases consumer product prototypes are built, at significant expense, to provide a product that is more easily adapted to photography. Each time a variation on the consumer product occurs new images must be captured at additional expense.

The same holds true for live-action consumer product commercials. For example, significant time and expense is incurred in dressing a set or identifying a remote location for a shoot. Additional time and expense is incurred in setting up cameras and lighting, hiring actors, positioning and/or modifying the consumer product to achieve a perfect image. Accordingly, a path for advertising-worthy photographs without the drawbacks described above would be beneficial to the advertising industry.

SUMMARY

The present disclosure is directed to image generation and, more specifically, to consumer product advertising image generation.

One aspect of the present disclosure is directed towards a method of generating a three-dimensional consumer product image. The method includes: distilling one or more objects of a three-dimensional model of a consumer product to corresponding three-dimensional geometric representations of the one or more objects; applying a visual attribute to the one or more three-dimensional geometric representations of the objects; rendering a plurality of two dimensional images from the three-dimensional geometric representations of the objects with applied visual attributes; defining one or more stacking orders of at least a portion of the plurality of two dimensional images; and delivering to a user the two-dimensional images and the defined stacking orders in a form that is importable into a computer-executable image editing program, the computer-executable image editing program capable of enabling user selection of one or more of the defined stacking orders and capable of producing a three-dimensional image of at least a portion of the consumer product based on the user-selected one or more defined stacking orders and the imported two-dimensional images.

Another aspect of the present disclosure is directed towards a method of generating a three-dimensional consumer product image. In this instance the method includes: distilling one or more objects of a three-dimensional model of a consumer product to corresponding three-dimensional geometric representations of the one or more objects; applying original layer assignment, original layer hierarchy and original shading associated with the three-dimensional model of the consumer product to the one or more three-dimensional geometric representations of the objects; rendering a first plurality of two-dimensional images based on the three-dimensional geometric representations of the one or more objects with original layer assignment, hierarchy and shading; applying a visual attribute to the first plurality of two-dimensional images; rendering a second plurality of two dimensional images from the first plurality of two dimensional images with applied visual attributes; defining one or more stacking orders of at least a portion of the second plurality of two dimensional images; and delivering to a user the second plurality of two-dimensional images and the defined stacking orders in a form that is importable into a computer-executable image editing program, the computer-executable image editing program capable of enabling user selection of one or more of the defined stacking orders and capable of producing a three-dimensional image of at least a portion of the consumer product based on the user-selected one or more defined stacking orders and the imported two-dimensional images.

Another aspect of the present disclosure is directed towards a system comprising a computing device that includes a processing device and a computer readable storage device storing data instructions that when executed by the processing device cause the computing device to: distill one or more objects of a three-dimensional model of a consumer product to corresponding three-dimensional geometric representations of the one or more objects; apply a visual attribute to the one or more three-dimensional geometric representations of the objects; render a plurality of two dimensional images from the three-dimensional geometric representations of the objects with applied visual attributes; and define one or more stacking orders of at least a portion of the plurality of two dimensional images. The rendered two-dimensional images and the defined one or more stacking orders are rendered and defined, respectively, in a form that is importable into a computer-executable image editing program.

BRIEF DESCRIPTION OF THE DRAWINGS

FIG. 12 is an example of a "frame stacking order" graphical user interface.

FIG. 15 is an example of a "trim build assignment" graphical user interface.

FIG. 18 is an exemplary sample of XML instructions for generating a consumer product advertising image.

DETAILED DESCRIPTION

Figure 1:
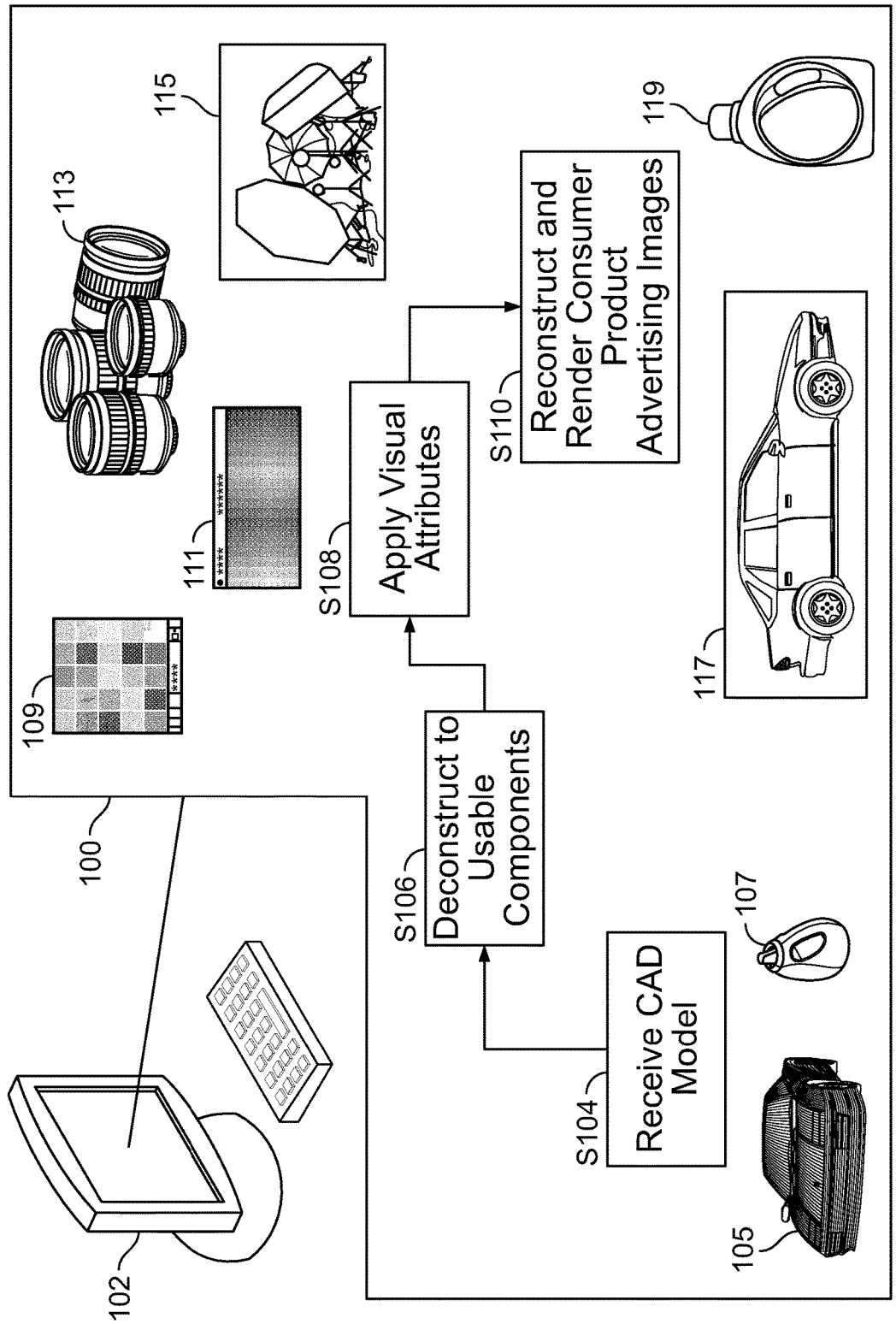
FIG. 1 is a schematic flowchart illustrating a system and method for generating a consumer product advertising image.

Various embodiments will be described in detail with reference to the drawings, wherein like reference numerals represent like parts and assemblies through the several view. Reference to various embodiments does not limit the scope of the claims attached hereto. Additionally, any examples set forth in this specification are not intended to be limiting and merely set forth the many possible embodiments for the appended claims.

The consumer product advertising image generation system and method of the present disclosure reduces the time and expense associated with physically capturing advertising images of a consumer product by, instead, creating a virtual consumer product in a virtual setting that can be positioned, colorized, texturized, lit, etc., and rendered to a two-dimensional or three-dimensional advertising image, or a sequence of such images that are substantially equivalent to physically captured images.

A system and method of generating a consumer product advertising image is depicted in the schematic flowchart of FIG. 1. The method 100 is configured to be performed by one or more computing devices 102 executing instructions that are stored in memory. The method 100, in the most general of terms, comprises establishing a computer-aided design (CAD) model (e.g. a computerized two-dimensional or three-dimensional model) of a consumer product, S104, such as a vehicle 105 or detergent bottle 107, etc. The method 100 then comprises deconstructing the model to usable geometric components, S106, and applying visual attributes (e.g., texture 109, color 111, lens effects and camera angles 113, lighting 115, etc.) to those components, S108. Once visual attributes have been applied, the method 100 further comprises reconstructing the components and attributes into a virtual consumer product advertising model that can be rendered to a two-dimensional or three-dimensional consumer product advertising image (or sequence of images), S110, such as the exemplary consumer product advertising images of vehicle 117 or detergent bottle 119, as illustrated in FIG. 1.

Figure 2:
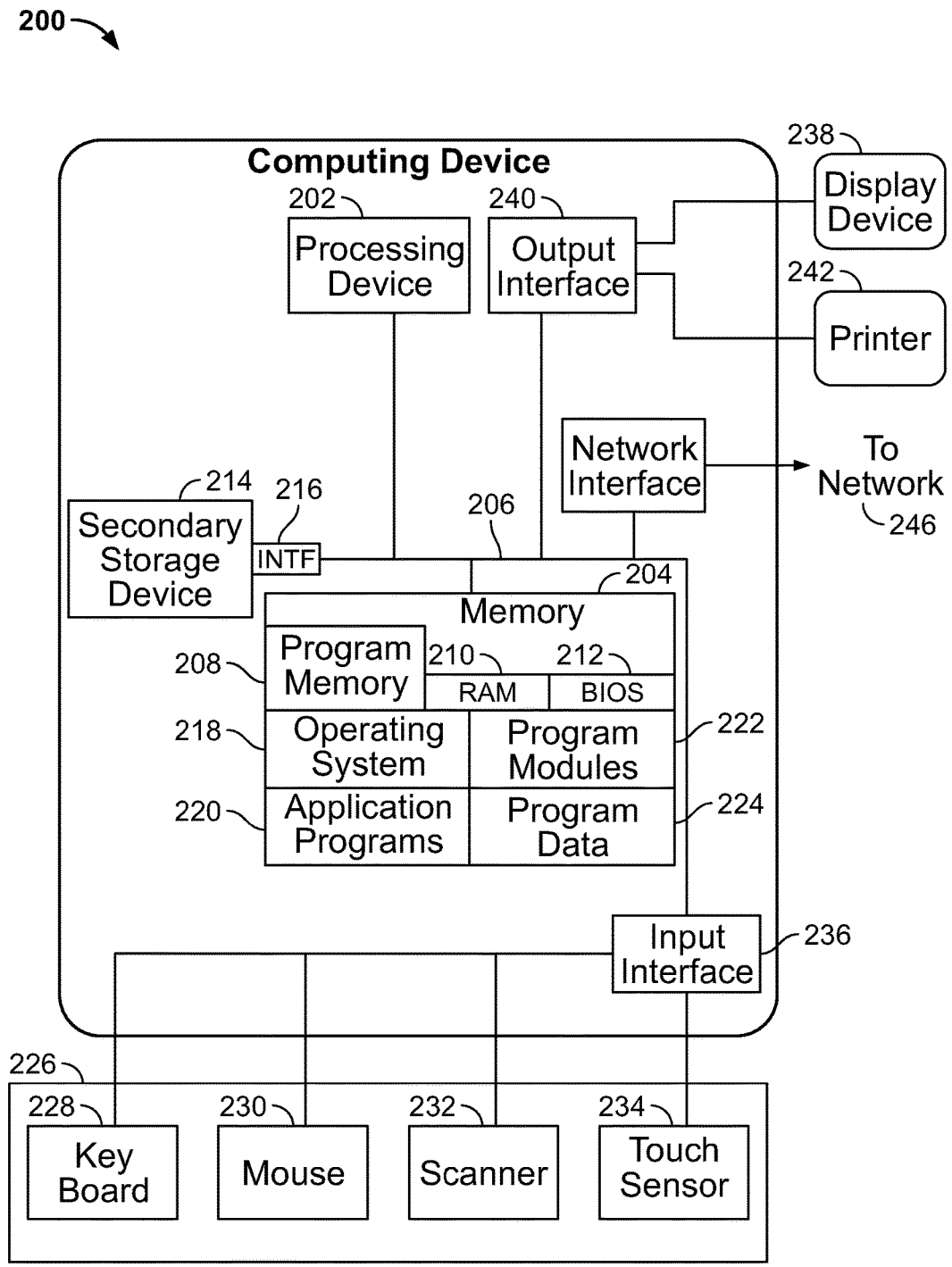
FIG. 2 illustrates an example of a computing device that can be used to implement aspects of the present disclosure.

FIG. 2 illustrates an exemplary architecture of a computing device 200 that can be used to implement aspects of the present disclosure. The computing device 200 can be in any suitable form including a microcontroller, a microprocessor, a desktop computer, a laptop computer, a tablet computer, a mobile computing device (e.g., smart phone, iPod™, iPad™, or other mobile device), or other devices configured to process digital instructions. Rather, it is understood that the exemplary computing device 200 may be configured specific to its intended use incorporating various peripherals and programming instructions, as described herein, to achieve desired operations. Further, it is understood that the computing device 200 is an example of programmable electronics, which may include one or more such computing devices, and when multiple computing devices are included, such computing devices can be coupled together with a suitable data communication network so as to collectively perform the various functions, methods and operations disclosed herein.

In general terms, the computing device 200 includes at least one processing device and at least one computer readable storage device. The processing device operates to execute data instructions stored in the computer readable storage device to perform various operations, methods, or functions described herein.

In more particular terms and with reference to FIG. 2, the computing device 200 includes at least one processing device 202, such as a central processing unit (CPU), as well as a system memory 204 and a system bus 206. The system bus 206 couples various system components including the system memory 204 to the processing device 202. The system bus 206 is one of any number of types of bus structures including a memory bus, a peripheral bus, and a local bus using any variety of bus architectures.

The system memory 204 includes program memory 208 and random access memory (RAM) 210. A basic input/output system (BIOS) 212 containing the basic routines that act to transfer information within the computing device 200, such as during start up, is typically stored in the program memory 208. In some embodiments, the computing device 200 also includes a secondary storage device 214, such as a hard disk drive or file server, for storing digital data. The secondary storage device 214 is connected to the system bus 206 by a secondary storage interface (INTF) 216. The secondary storage device 214, and its associated computer readable media, provides nonvolatile storage of computer readable instructions (including application programs and program modules), data structures, and other data for the computing device 200.

Although the exemplary computing device 200 described herein employs a secondary storage device 214, in some the embodiments the secondary storage device is eliminated or its hard disk drive/file server configuration is replaced with an alternative form of computer readable storage media. Alternative forms of computer readable storage media include, but are not limited to, magnetic cassettes, flash memory cards, digital video disks, Bernoulli cartridges, compact disc memories, digital versatile disk memories, and random access memories. Some embodiments of the secondary storage devices 214 include non-transitory media. Further, the computer readable storage media can include local storage or cloud-based storage.

A number of program modules can be stored in the memory 204, or the secondary storage device 214. These program modules include an operating system 218, one or more application programs 220, other program modules 222 as described herein, and program data 224. The computing device 200 can utilize any suitable operating system, such as Microsoft Windows™ Google Chrome™, Apple OS, and any other operating system suitable for a computing device.

The computing device 200 typically includes at least some form of computer readable media, e.g., computer readable media within the memory 204 or secondary storage device 214. Computer readable media includes any available media that can be accessed by the computing device 200. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 200.

In some embodiments, a user provides inputs to the computing device 200 through one or more input devices 226. Examples of input devices 226 include a keyboard 228, a mouse 230, a scanner 232, and a touch sensor 234 (such as a touchpad or touch sensitive display). Other embodiments include other input devices 226 necessary for fulfilling the operations described herein. In some embodiments, the input devices 226 are incorporated into the computing device 200 itself. In some embodiments, the input devices 226 are external to the computing device 200 and are connected to the processing device 202 through an input interface 236 that is coupled to the system bus 206. The input devices 226 can be connected by any number of input/output interfaces, such as parallel port, serial port, game port, universal serial bus, or a custom interface. Wireless communication between input devices and the input interface 236 is possible as well, and includes infrared, BLUETOOTH® wireless technology, 802.11/a/b/g/n, cellular or other radio frequency communication systems in some possible embodiments.

In the example embodiment of FIG. 2, the computing device 200 incorporates within or is operably coupled to a display device 238. Examples of the display device 238 include a monitor, a liquid crystal display device, a projector, or a touch sensitive display device. The display device 238 is also connected to the system bus 206 via an output interface 240, such as a display controller. In addition to the display device 238, the computing device 200 can control via output interface 240 various other peripherals such as a printing device 242 or speaker (not shown). As with the input interface 236, the output interface 240 can comprise any number of input/output interfaces such as those described in the paragraph above.

The computing device 200 further includes a network interface 244 that includes a network communication device to communicate digital data across a data communication network 246. An example of the network interface 244 includes a wireless transceiver for transmitting digital data over a wireless network. The wireless transceiver is configured to work with one or more wireless communication technologies such as cellular communication, Wi-Fi communication (such as that conforming to one of the IEEE 802.11 family of communication protocols), Bluetooth® communication, and the like. In other embodiments, the network interface 244 is an Ethernet network interface device having an Ethernet port for receiving an Ethernet cable to transmit and receive digital data across the Ethernet cable to a network 246 such as a local area network or the Internet.

Figure 3:
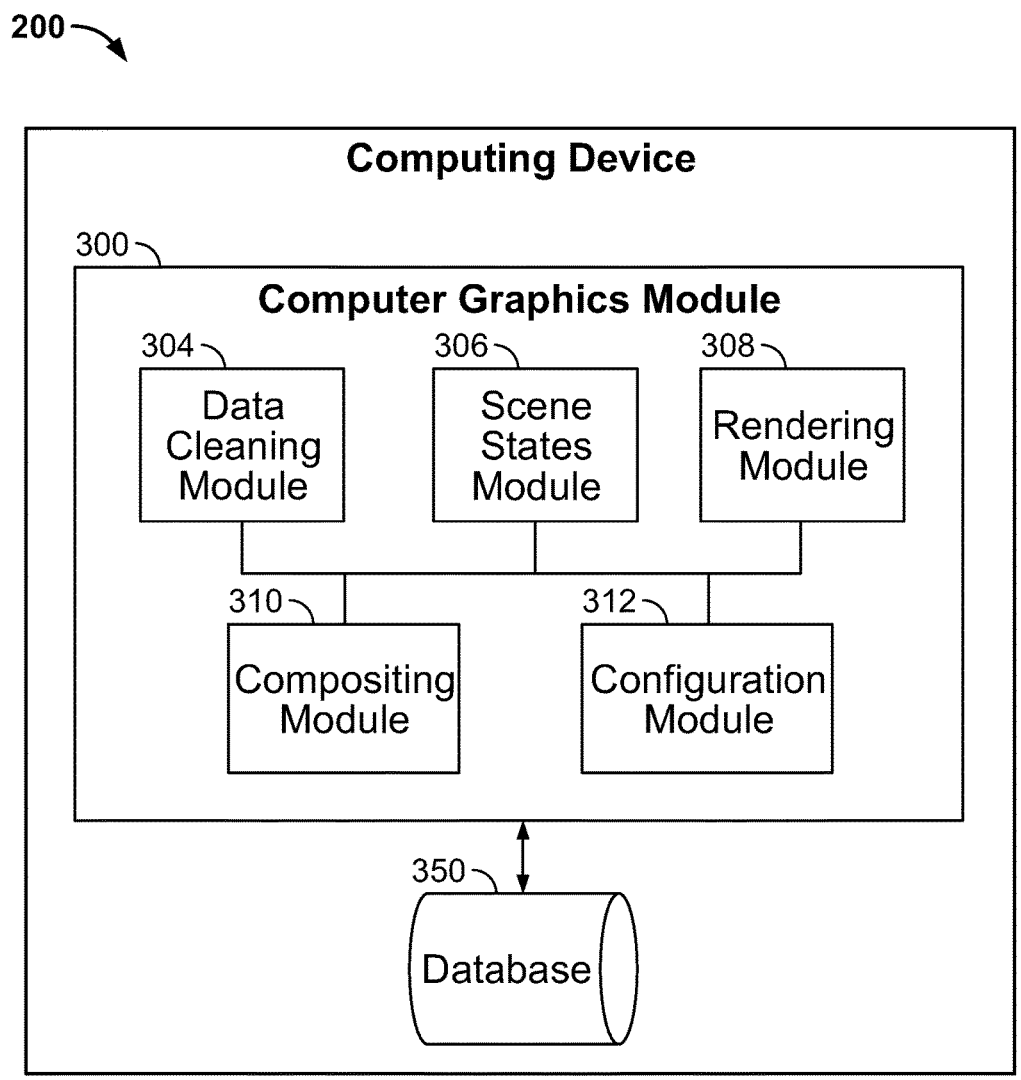
FIG. 3 is a schematic of the computing device and program modules that can be used to implement aspects of the present disclosure.

FIG. 3 provides an exemplary schematic of the computing device 200 and the program modules, e.g., program modules 222, which are stored in memory and utilized by the computing device 200 to perform the various functions and operations of the system and method for generating a consumer product advertising image. As shown, the computing device 200 generally includes a computer graphics module 300 and a database 350 accessible to the computer graphics module 300. The computer graphics module 300 further includes a data cleaning module 304, a scene states module 306, a rendering module 308, a compositing module 310 and a configuration module 312. Each of the modules 304, 306, 308, 310 and 312 will be described in further detail below in relation to the flowchart of FIG. 4.

Figure 4:
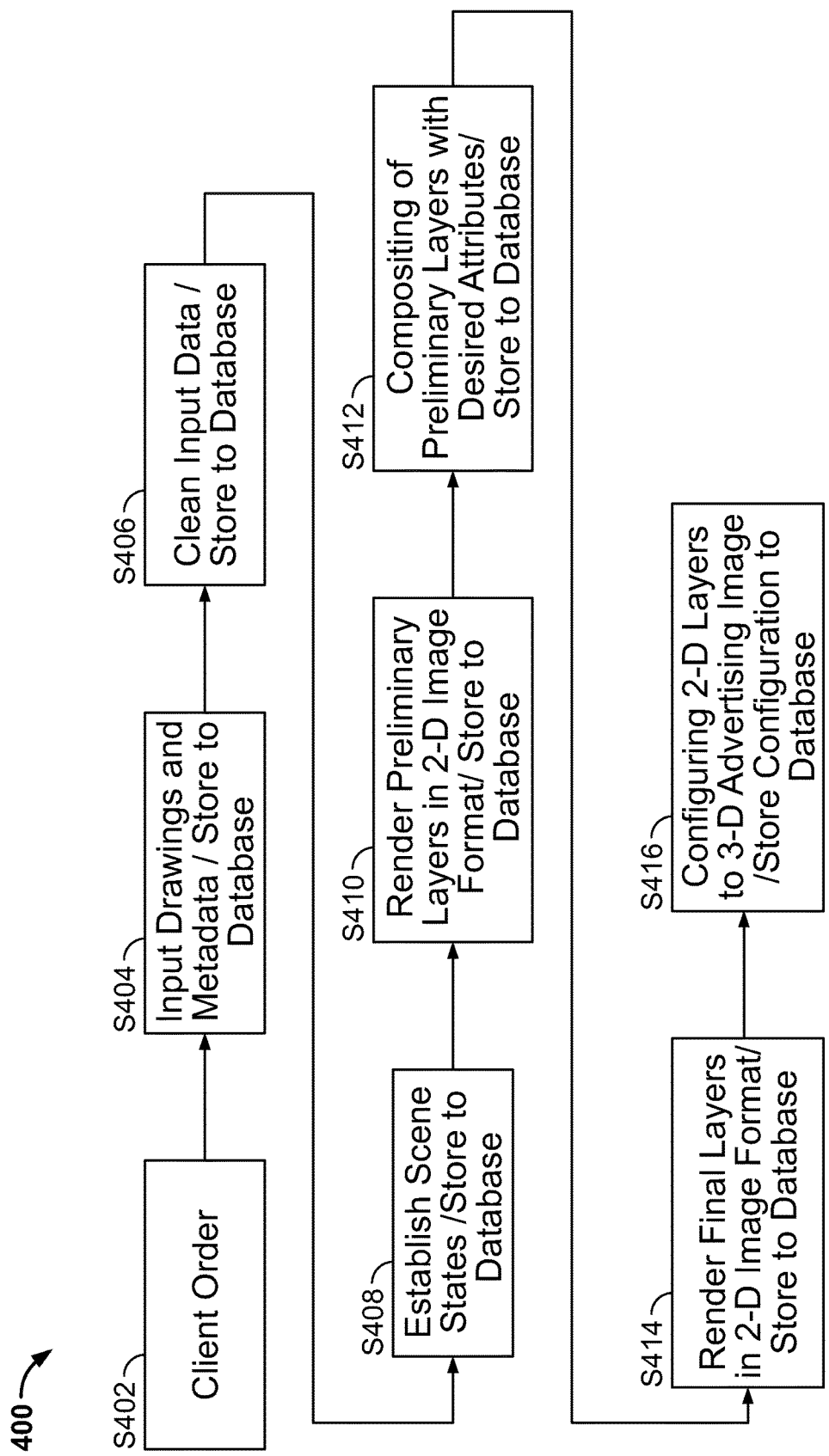
FIG. 4 is a flowchart of a method generating a consumer product advertising image.

FIG. 4 is a flowchart illustrating an example embodiment of the method 100 for generating a consumer product advertising image; this embodiment of the method 100 will hereafter be identified as method 400. For convenience of explanation and understanding, the method 400 will be described with reference to a consumer product comprising an automobile. However, it is to be understood that the method may be applied to any consumer product for which two-dimensional or three-dimensional digital drawings, e.g., CAD drawings, exist or may be created.

As shown in FIG. 4, the method 400 begins with an order placed by a client to receive one or more of an advertising-worthy image of an automobile, S402. The client then supplies original input data (e.g., two-dimensional or three-dimensional digital data such as that provided by CAD files) for the automobile from which the advertising images are to be generated and the input data is stored to the database 350, S404. The input data is received into the computing device 200 via the computer graphics module 300 (e.g., Autodesk Maya or other computer graphics program such as 3ds Max, AOI, Blender, Cinema 4D, Clara.io, MODO, Shade 3D, Softimage, ZBrush, etc.) and stored to the database 350 in manner such that all original history, modifiers, constraints, layers, and connections, etc., relating to the digital data are maintained.

The input data generally includes all parts to be manufactured for the automobile as well as assembly data for assembling the components of the automobile into various final builds. The final build of the automobile, or the "end item model" (EIM) of the automobile, represents all selected options for the automobile. Such options may include, but are not limited to, the type of engine, the type of tires, the type of stereo, the type of upholstery, the type of interior trim, the type of exterior trim, the color of the automobile, the color of the upholstery, the type of suspension, the type of brakes, etc. With thousands to millions of builds possible for the automobile, the input data additionally includes metadata that associates the various components/parts of the automobile with the associated possible builds; the originally supplied metadata is also stored in the database 350.

Figures 5, 6:
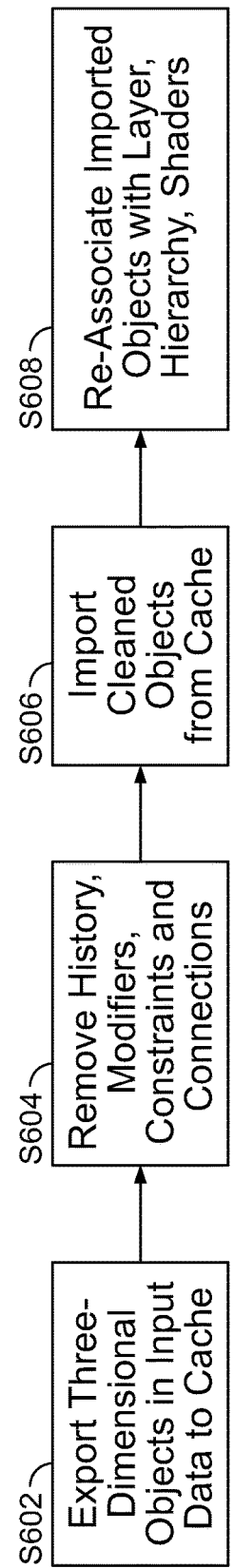
FIG. 5 is schematic of a spreadsheet representation of metadata.
FIG. 6 is a flowchart illustrating the operation of a data cleaning module.

FIG. 5 provides a simplified spreadsheet 500 representation of the metadata illustrating the connection between parts and various EIM builds. As shown, "Set of Parts A" is to be used in the number one, two, five and eight EIM builds of the automobile, while "Set of Parts B" is to be used in the number two, three, and seven EIM builds of the automobile, etc. Of course, the actual organizational structure is much more complicated as thousands of parts, thousands of parts relating other parts, and thousands of EIM builds are possible.

Referring back to FIG. 4, with the input data and metadata stored as one or more Maya files within the database 350, the data cleaning module 304 is employed to clean the input data and store the cleaned data to the database 350, S406. The data cleaning module 304 generally operates in accordance with the flowchart of FIG. 6. First, all three-dimensional objects of the original input data are exported to an ALEMBIC™ cache, S602, where all history, modifiers, constraints, and connections are removed from the input data, S604.

ALEMBIC™ is a computer graphics interchange file format that can be used with numerous computer graphic applications. Through removal of the noted items, the exported objects are distilled into a non-procedural, application independent set of geometric results. The cleaned three-dimensional objects in the Alembic cache are then imported back into Maya, S606. Maya has operated to maintain the display layers, shader assignment and hierarchy (e.g., order of assembly) of the original input data which enables the imported objects to be placed back into its original layer and hierarchy, and to be re-associated with its original shaders, S608.

In using the above-described process, the data cleaning module 304 enables the removal of any connections, attributes, or irregular settings that may have been previously set within the starting geometry. Accordingly, instead of attempting to check every possible combination of automobile components that might cause a problem when preparing the advertising images, the data cleaning module 304 essentially forces the connections, attributes or irregular settings to be reset/eliminated, yet allows the cleaned, imported objects to maintain their connections to, for example, their display layers, their place in the geometrical hierarchy, and their shaders.

Figure 7:
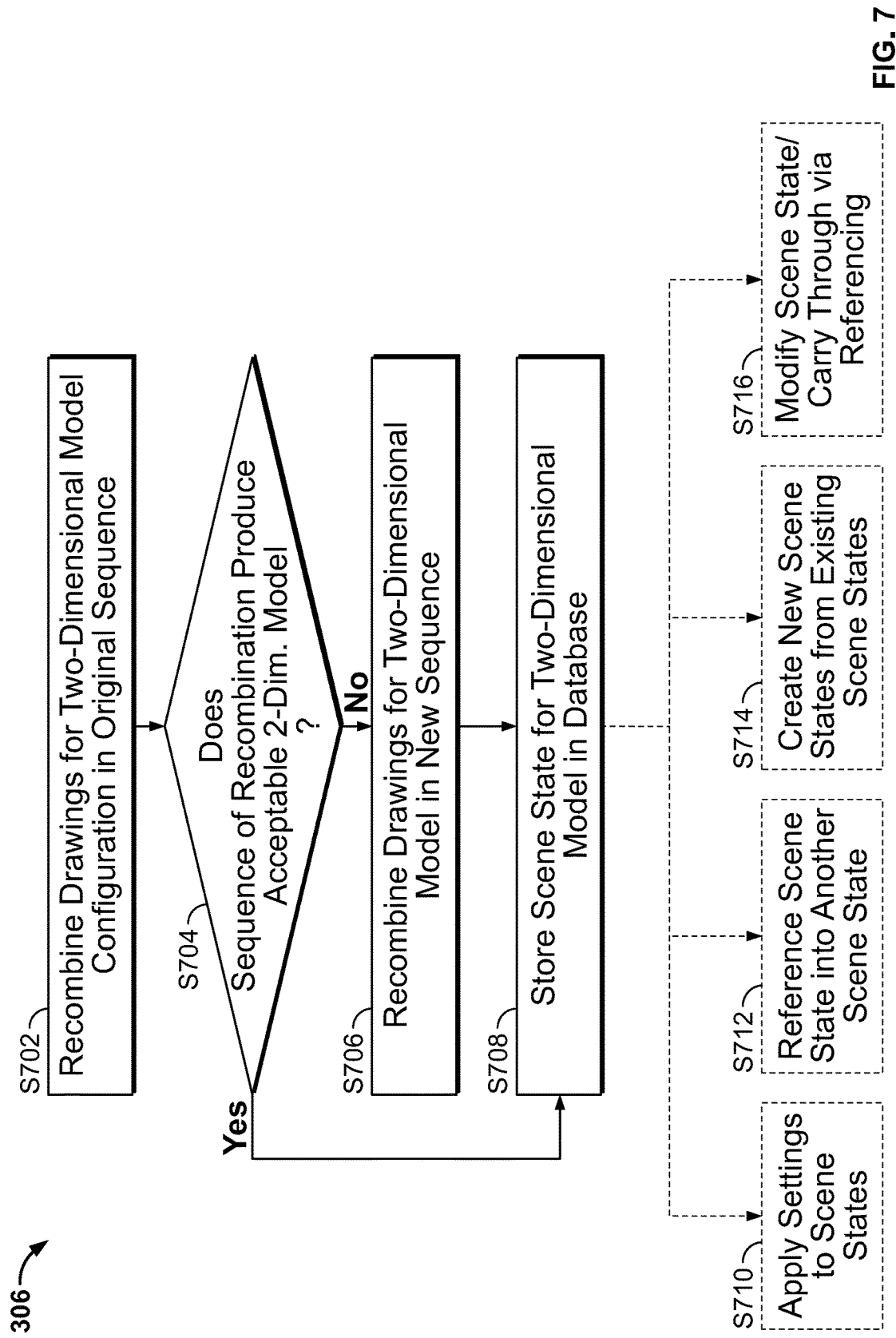
FIG. 7 is a flowchart illustrating the operation of the scene state module.

Referring once again to FIG. 4, and as indicated above, once the input data has been cleaned, the cleaned three-dimensional objects, which have been re-associated with their layers, hierarchies and shaders, are combined into one or more scene states, via scene state module 306, within Maya. The scene state module 306 generally operates in accordance with flow chart of FIG. 7. As shown, the scene state module 306 is used to recombine the cleaned, three-dimensional objects into a virtual two-dimensional or three-dimensional model that will be used to produce a two-dimensional image representative of each component or each combination of components necessary to produce the client-requested advertising images. A first attempt at establishing the virtual two- or three-dimensional model utilizes the original layering and hierarchy sequence, as well as shaders, which were re-associated with the objects, S702. If the original layering and hierarchy sequence produces an acceptable virtual two- or three-dimensional model for a component or combination of components that will be used in the advertising image, S704 [YES], the layering and hierarchy sequence, as well as the associated shaders, are related and stored as a scene state within the database 350, S708. If the original layering and hierarchy sequence produces an unacceptable virtual two- or three-dimensional model for a component or combination of components that will be used in the advertising image, S704 [NO], a new layering and/or hierarchy sequence (and/or shader association) is established to produce an acceptable virtual two- or three-dimensional model, S706, and the new layering and hierarchy sequence, as well as the associated shaders, are related and stored as a scene state within the database 350, S708.

By way of illustrative example, consider a situation where an advertising image of each type of brake available on an automobile is requested in a configuration where each brake is separated from the wheel rims of an automobile. When the automobile is viewed externally, one sees the wheel and the rim with brake residing behind the rim. The scene state module 306 enables a user to create a scene state of a virtual model wherein the brake is moved apart/separated from, yet still proximate to, the rim. A separate, but similar scene state can be additionally created for each type of brake and each type of rim available on the automobile.

With the scene states established within the database 350, the scene state module 306 can be utilized to perform various other functions in relation to the scene states. For example, the scene state module 306 can be used to apply settings, e.g., treating a layer as car paint, to the objects within the scene state, S710. The scene state module 306 can also be used to enable the referencing of one scene state into another scene state, S712. Further, the scene state module 306, can be used to create a new scene state from existing scene states (e.g., duplicating, deleting or modifying a scene state), S714. And, the scene state module 306, can be used to modify/update a scene state, e.g., change geometry, change shading, etc., whereby all modifications/updates are carried through to all other scene states that reference the modified/updated scene state. Accordingly, the scene state module 306 enables the use of a single file, e.g., a scene state, where changes can be made and carried through to every other file referencing the single file. All referencing between scene states is maintained in the database 350.

Referring once again to FIG. 4, with all desired component, or combination of component, scene states (e.g., two-dimensional images of components/objects with desired layering, hierarchy and shading) established, the scene states are then rendered in layers, by the rendering module 308 (e.g., the rendering function of Maya). The render layers within Maya are then submitted to a graphics processing unit (e.g., a rendering farm) utilizing a render submission tool that is configured to interface with Maya. The render submission tool enables the manual selection of desired layers.

Figure 8:
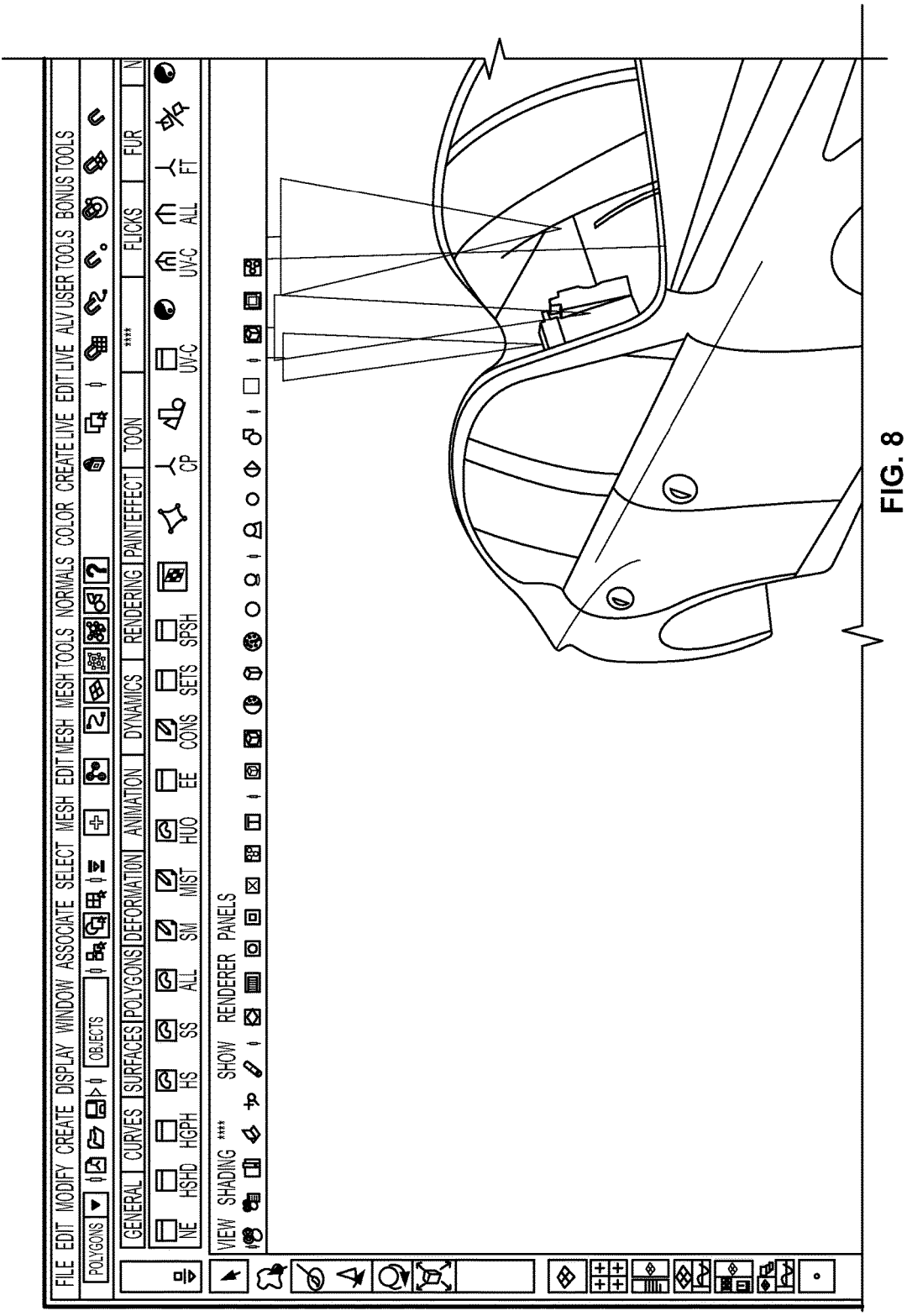
FIG. 8 is an example of a graphical user interface usable by the rendering module
Figure 8:
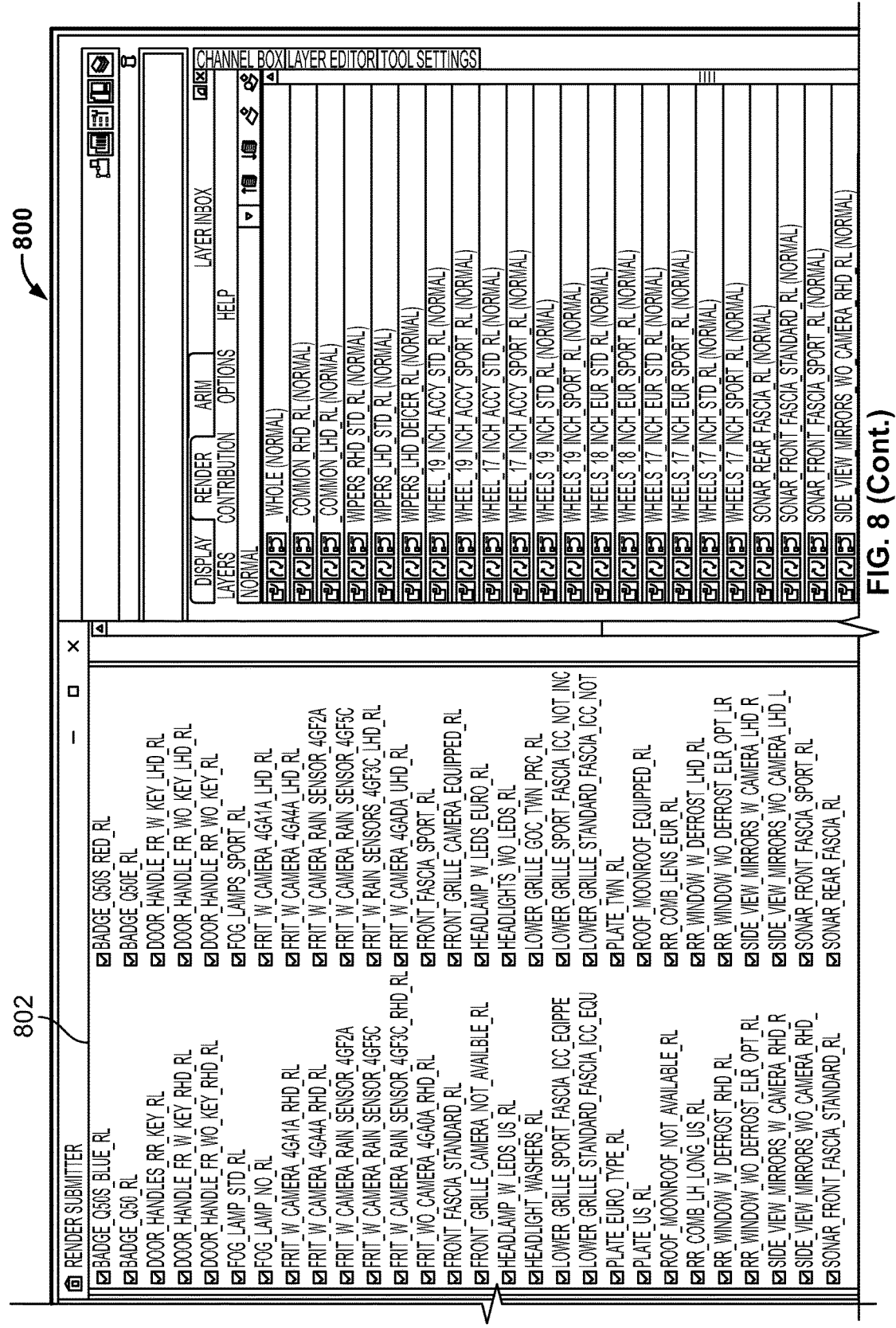
Figure 8:
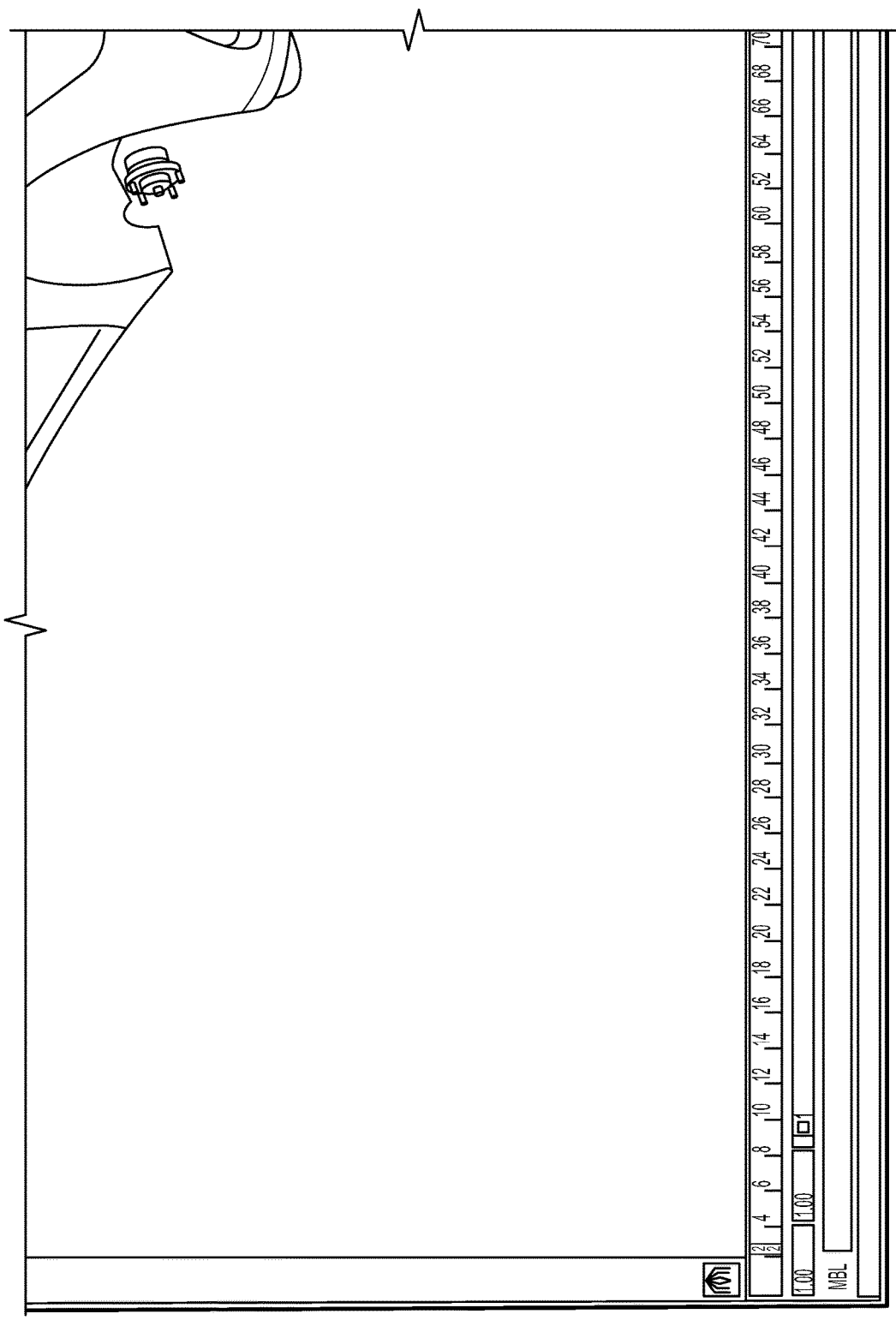

FIG. 8 provides an exemplary screen shot of the render submission tool 800 illustrating selected layers 802 for submission. The result of rendering the layers is a preliminary set of layers in two-dimensional image format that can be combined, e.g., stacked, to create component images, S410; the preliminary set of layers is stored to the database 350.

Referring once again to FIG. 4, upon the completion of the rendering of the preliminary set of layers, compositing of the preliminary layers is performed, S412, using the compositing module 310 of the computer graphics module 300; compositing data is stored to the database 350. The compositing module 310 (e.g., compositing function of Maya) operates to combine layers to display desired component images to an artist wherein the artist can apply image attributes beyond the layering, hierarchy and shaders that were applied in the preliminary layers. The image attributes applied through use of the compositing module 310 by the artist can include but are not limited to lens effects for sharpening or blurring an image, textures (e.g., wood, plastic, leather, etc.), camera angles (e.g., providing a 360 deg. view or less than a 360 deg. view), lighting, contrasting, etc. The compositing module 310 tracks the attributes that are applied to the preliminary layers as additional layers to be rendered.

In some instances different sets of attributes need to be applied to the same preliminary layers (e.g., an attribute of a different lens effect needs to be applied to the component image). The compositing module 310 tracks these different sets of attributes as rendering layers so that multiple images of a component, each incorporating a different set of attributes, may be generated with a second and final layer rendering, which is described further below.

Referring once again to FIG. 4, once compositing of the two-dimensional preliminary layers has been performed, the rendering module 308 (e.g., rendering function of Maya) is utilized by the computing device 200 to perform a second and final rendering of the layers, including the attribute layers, in a two-dimensional image format, S414; the final layers are stored to the database 350. The final layers, along with the configuration module 312 (described further below), can be delivered to the client to construct the three-dimensional advertising images requested.

Returning once again to FIG. 4, the configuration module 312 is used to generate three-dimensional advertising images from the rendered, two-dimensional image format, final layers, S416; the configurations, e.g., defined stacking orders of the rendered two-dimensional images are stored to the database 350. A schematic of the configuration module 312 is provided in FIG. 9. As shown the configuration module 312 includes an "asset creation" module 902, an "asset deletion" module 904, a "config images" module 906, a "config parts" module 908, and a "trims" module 910.

The "asset creation" module 902 enables a user to establish a part name for each of the final component images as well as designate whether the named part can inherit attributes from other named parts and/or other named images (named images are described in further detail below). The "asset creation" module 902 also enables a user to filter the type of attributes that the named part can inherit so that the part can inherit only those attributes needed. The "asset creation" module 902 further enables a user to designate whether the named part has a finish (e.g., textured surface, reflective surface, etc.) and/or is painted/colored.

Figure 10:
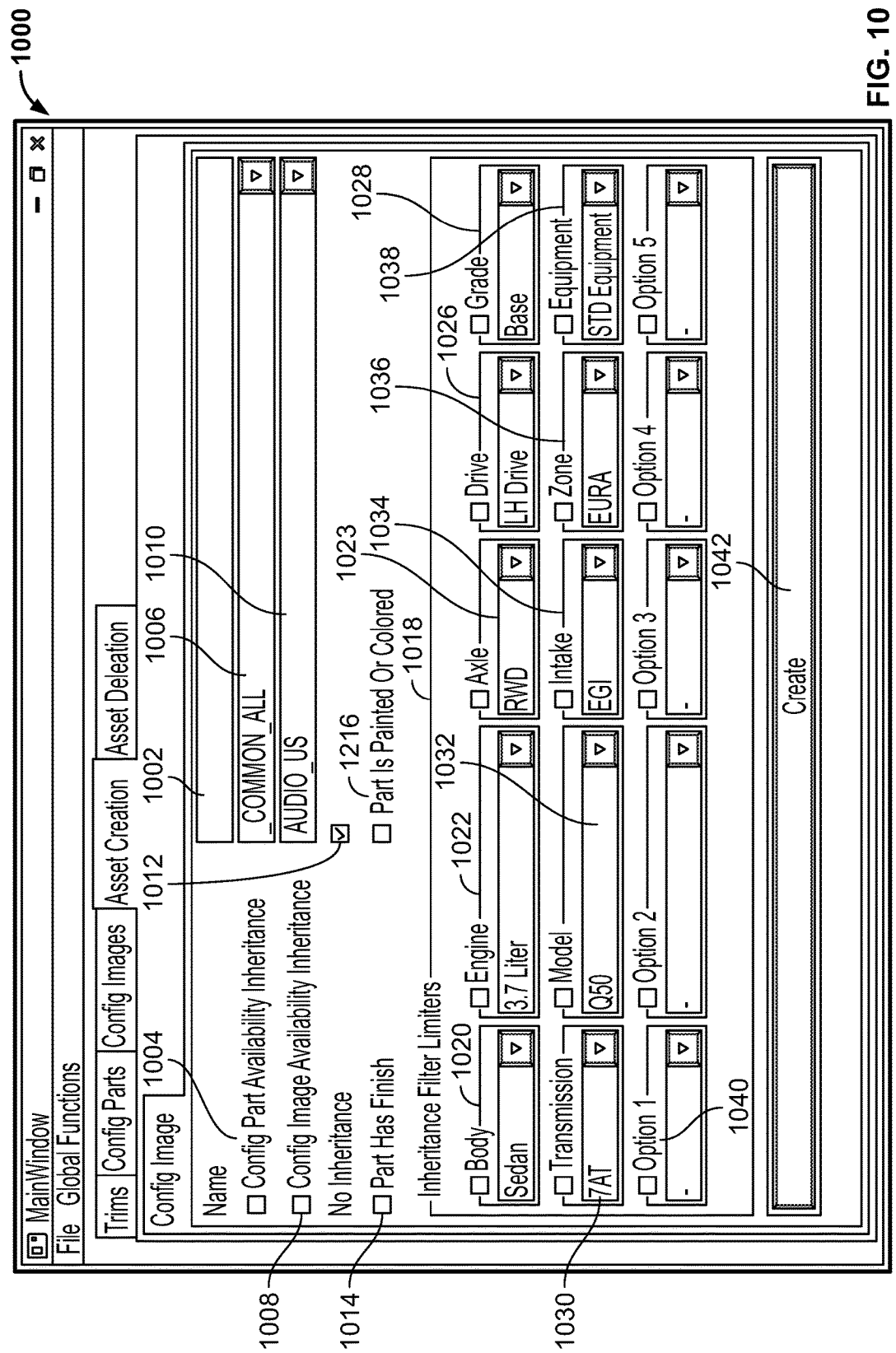
FIG. 10 is an example of an "asset creation" graphical user interface

An example of an "asset creation" graphical user interface 1000 is illustrated in FIG. 10. As shown, the interface 1000 includes a part name field 1002, a check box 1004 for designating the ability to inherit attributes from a named part, an inheritance named part field 1006 for selecting one or plurality of named parts from which the present named part may inherit attributes. The interface 1000 further includes a check box 1008 for designating the ability to inherit attributes from a named image and an inheritance named image field 1010 for selecting one or a plurality of named images from which the present named part may inherit attributes. A check box 1012 for disabling all inheritance is also provided. Check boxes 1014 and 1016 provide the option for designating whether the currently named part has a finish and/or is painted/colored, respectively. The interface 1000 further includes a filter panel 1018 providing a plurality of options for filtering inheritance attributes including a body filter 1020, an engine filter 1022, an axle filter 1024, a drive filter 1026, a grade filter 1028, a transmission filter 1030, a model filter 1032, an intake filter 1034, a zone filter, 1036, an equipment filter 1038, and various option filters 1040. The interface 1000 also includes a "create" button 1042 whose selection establishes the named part in the database 350.

Figure 9:
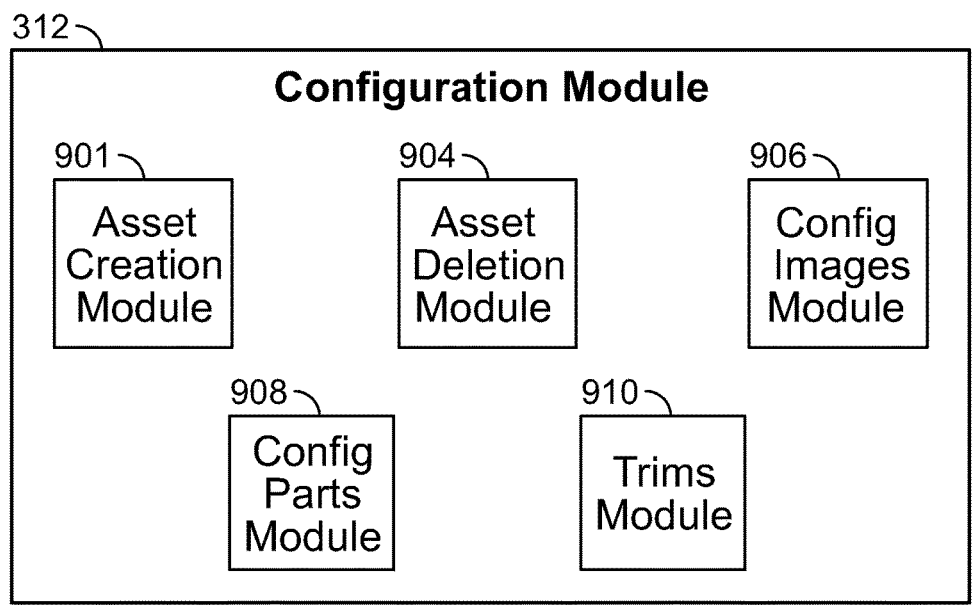
FIG. 9 is a schematic of a configuration module.
Figure 11:
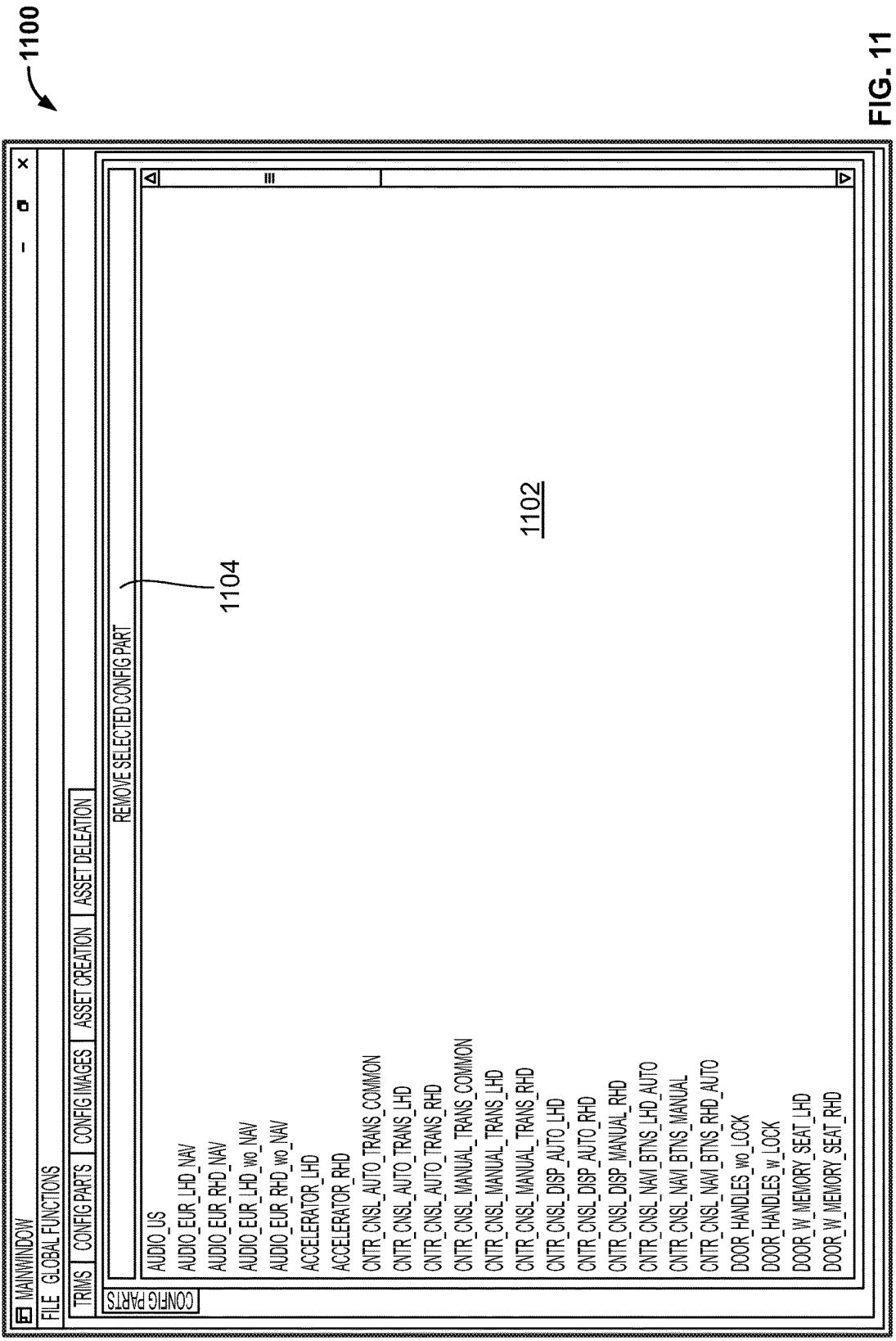
FIG. 11 is an example of an "asset deletion" graphical user interface.

The "asset deletion" module 904, see FIG. 9, enables a user to delete a named part if it is no longer being used. An example of an "asset deletion" graphical user interface 1100 is provided in FIG. 11. As shown, the interface 1100 provides a listing panel 1102 that lists the named parts held within the database. A user may select one or more of the parts listed and click on the remove selected part button 1104 to remove the named part from the database 350.

The "config images" module 906 enables a user to define an image by naming the image and identifying which of the named parts will be included in the named image. It further allows a user to define in which order the named parts should be stacked or layered to create the named image. An example of a "config images" graphical user interface 1200 is provided in FIG. 12. As illustrated, the "config images" graphical user interface 1200 is presented in a spreadsheet configuration where each row 1202 represent an image layer, e.g. (a final rendered layer), in a configurable stack of images, each column 1204 represents a frame number of the final asset and each cell 1206 defines the stacking order of the layer image which varies for each frame, with zero comprising the bottom layer.

Figure 13:
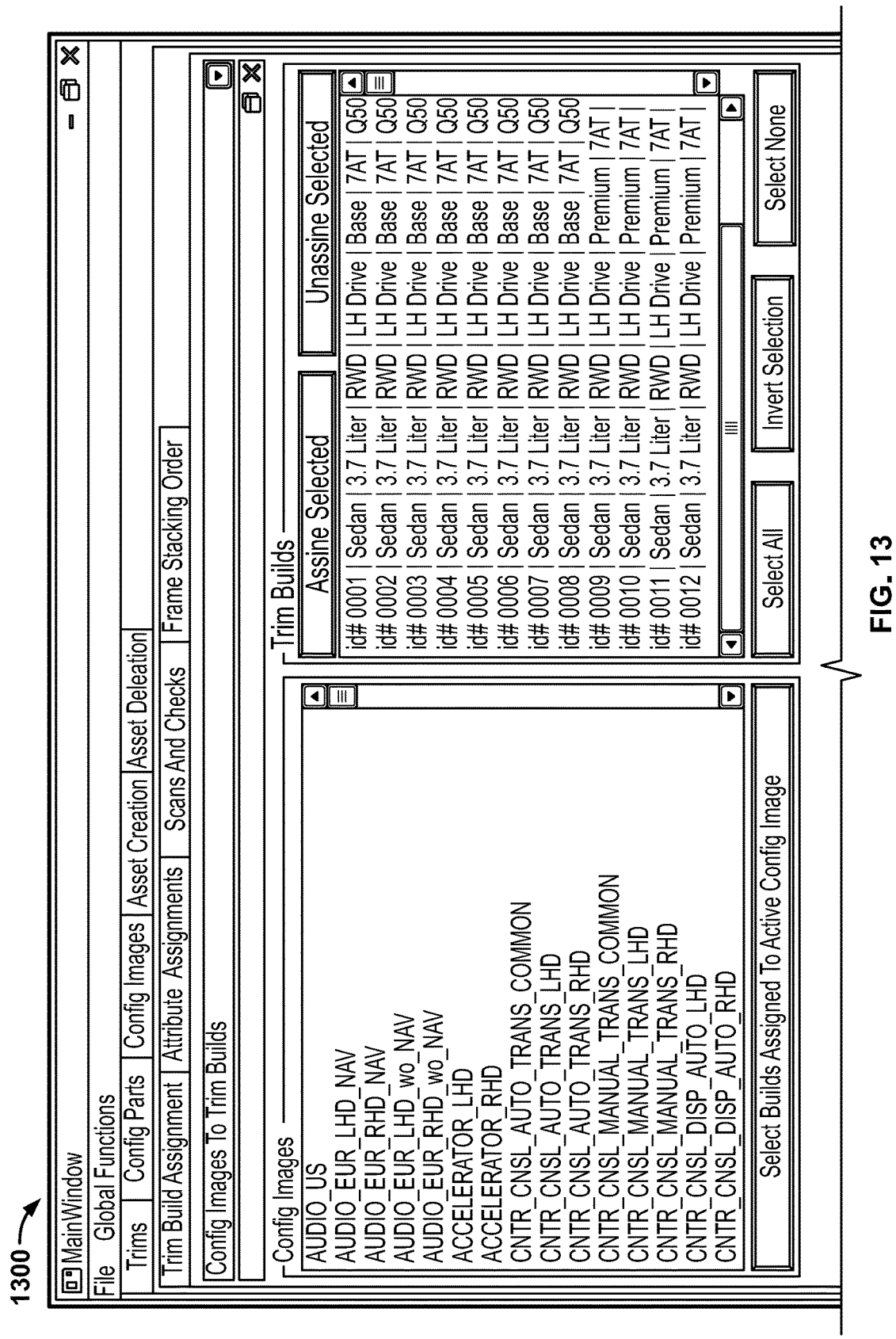
FIG. 13 is an example of a "trim builds assignment" graphical user interface.
Figure 13:
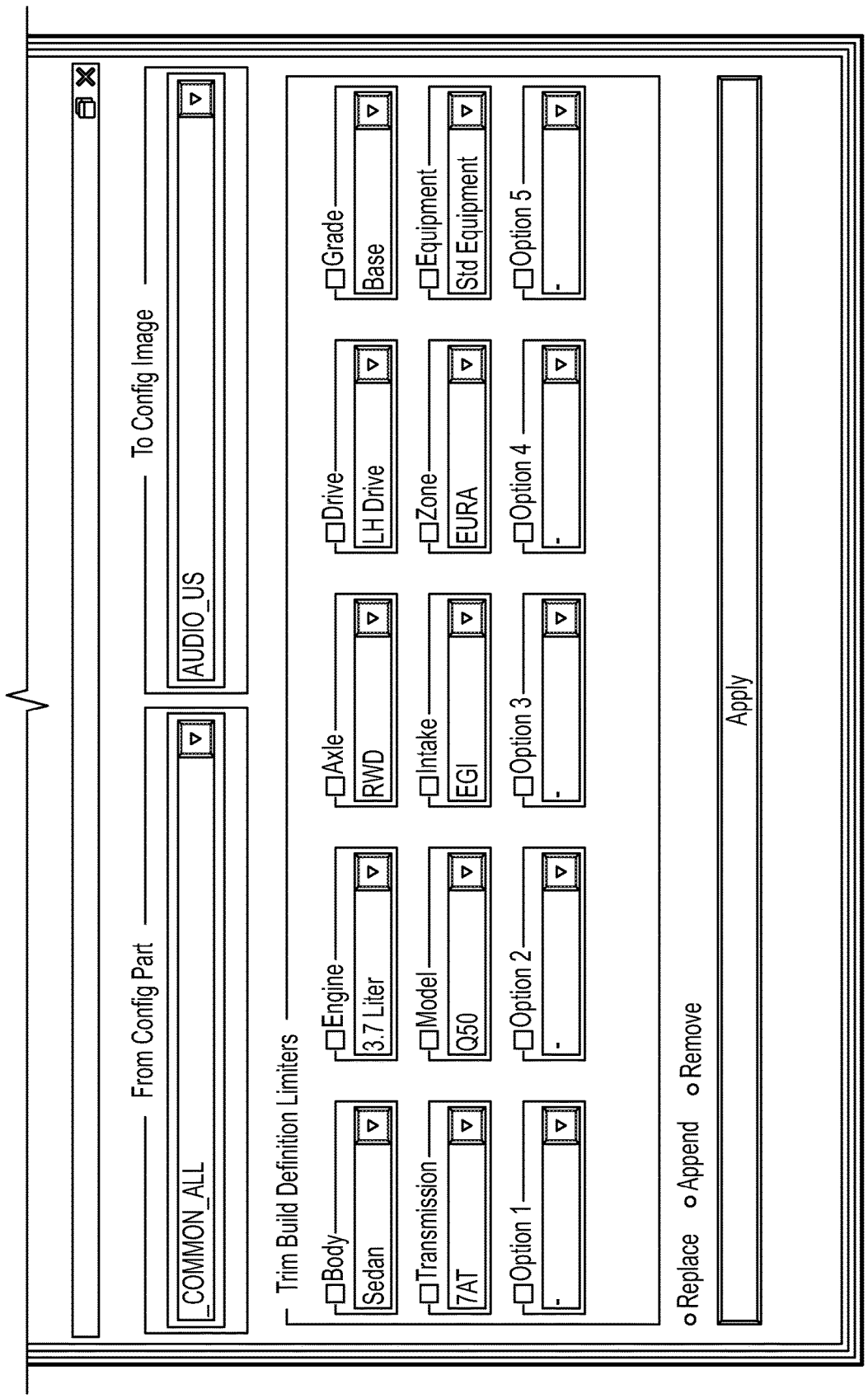
Figure 14:
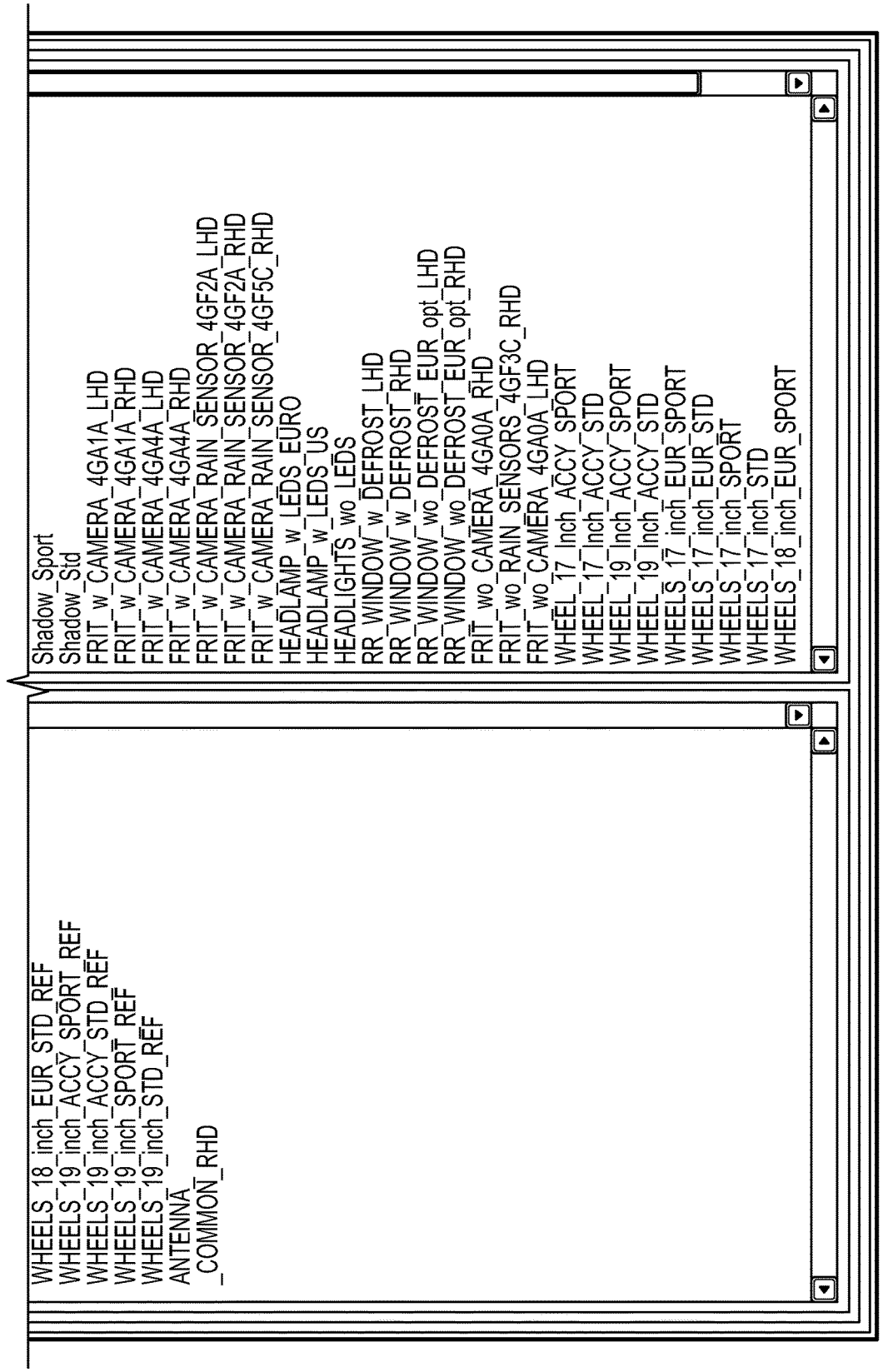
FIG. 14 is an example of an "attribute assignments" graphical user interface.

With the named image created and saved to the database 350, the named image can be assigned to different trim builds; the named image can comprise a single frame or a sequence of frames. An example of a "Trim Build Assignment" graphical user interface 1300 is provided in FIG. 13. More specifically, interface 1300 allows the user to insert any new image layers into existing EIM builds. In the context of the automobile example, the new image layers are generally combinations of parts that cannot exist on their own, such as brakes and rims. Further, the named image can be assigned various attributes. An example of an "Attribute Assignment" graphical user interface 1400 is provided in FIG. 14. In this example, the named parts are identified as having a paint attribute, see left column 1402, or not having a paint attribute, see right column 1404.

Figure 15:
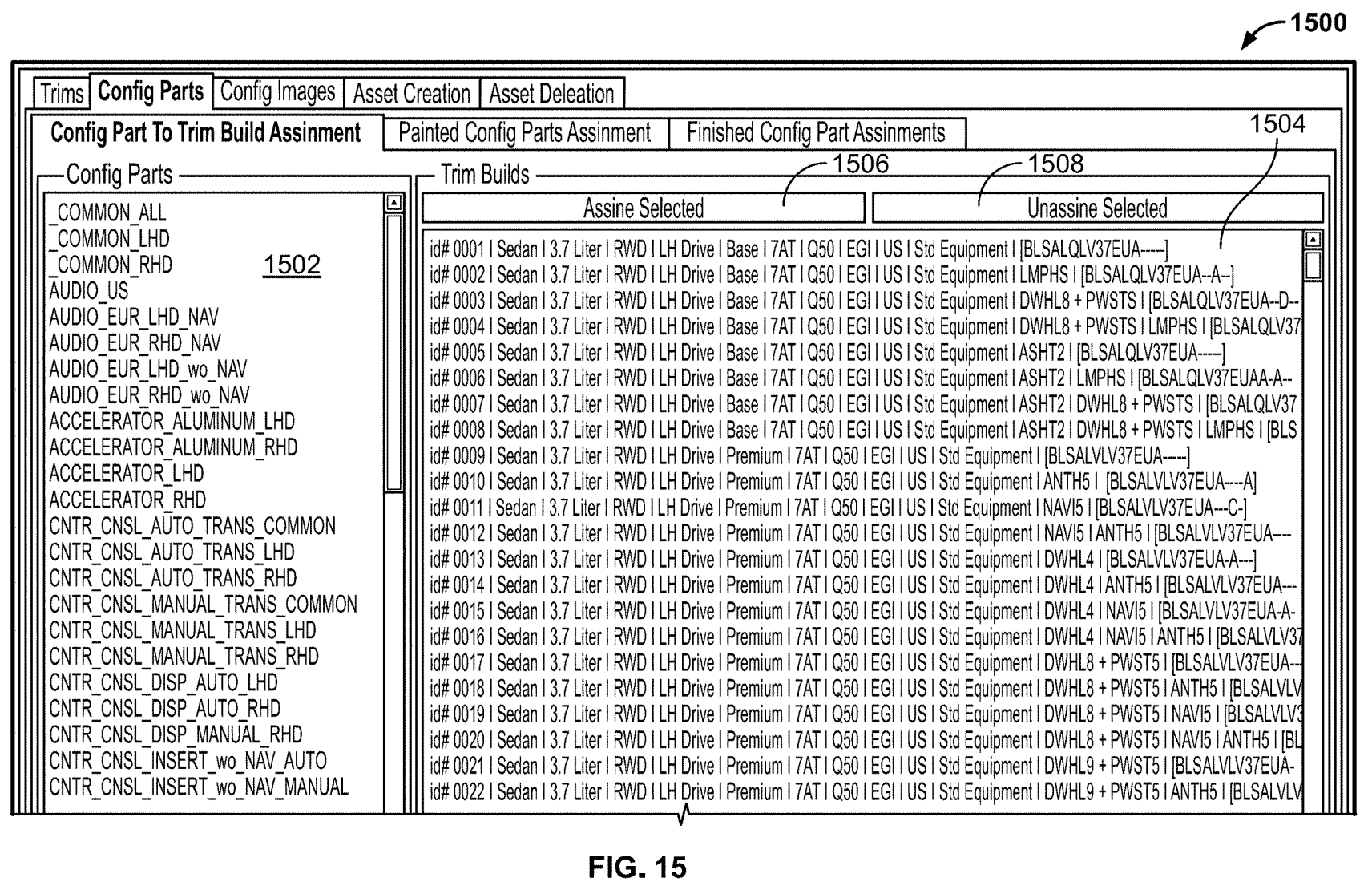
Figure 15:
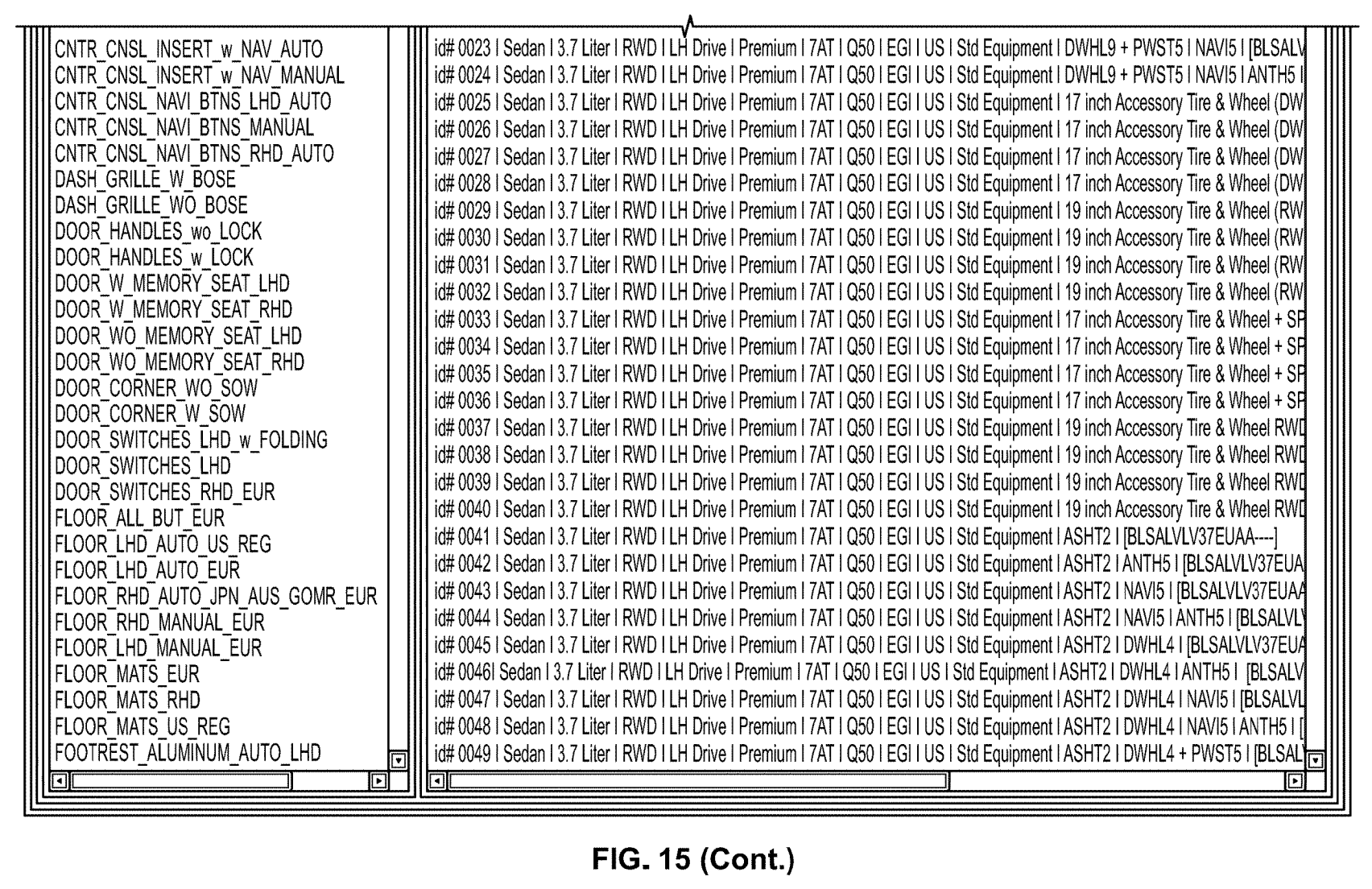
Figure 16:
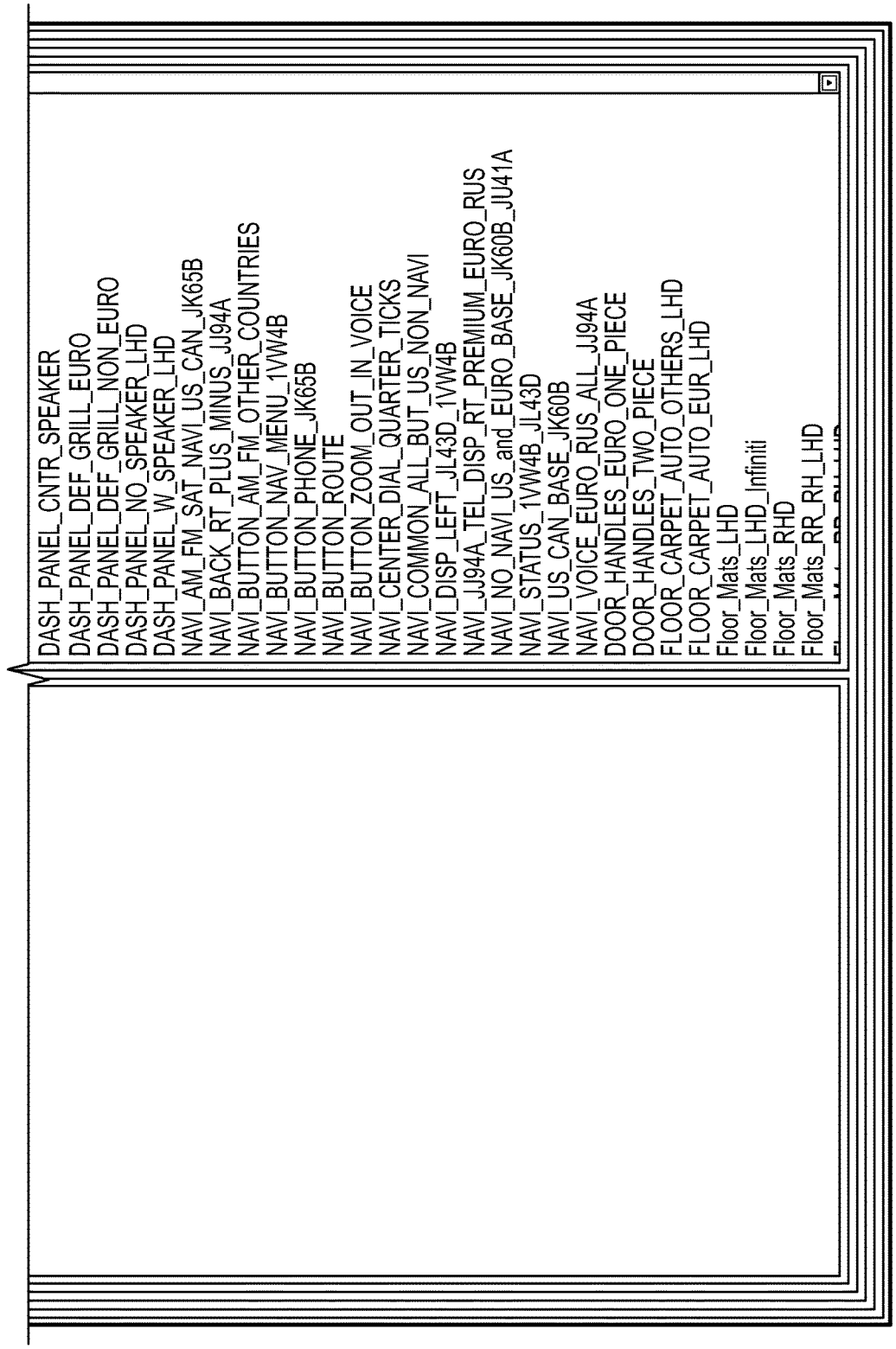
FIG. 16 is an example of a "finished parts assignment" graphical user interface.

The "config parts" module 908, see FIG. 9, enables a user to view the vehicle trims (e.g., base model or higher grade model of the vehicle) to which a named part is assigned and further enables a user to assign a named part to a trim or to remove a named part from a trim. Similarly, the "config parts" module 908 enables a user to view, add or delete a named part to a painted parts assignment, and/or to a finished part assignment. An example "config parts" graphical user interface 1500 for trim build assignment is illustrated in FIG. 15. As shown, interface 1500 includes a named parts panel 1502 that lists the various parts available as well as a trim build panel 1504 that lists that various trims to which a named part may be assigned. The assignment or unassignment of a named part occurs by selecting one or more named parts from the panel 1502, then selecting one or more of the trim builds from panel 1504 and clicking the assign button 1506 or unassign button 1508, respectively. Similar user interfaces are provided for the painted parts assignment (see FIG. 14 described herein) and the finished (e.g., texture) parts assignment An example "finished parts assignment" graphical user interface 1600 is illustrated in FIG. 16 and includes columns 1602, 1604.

Figure 17:
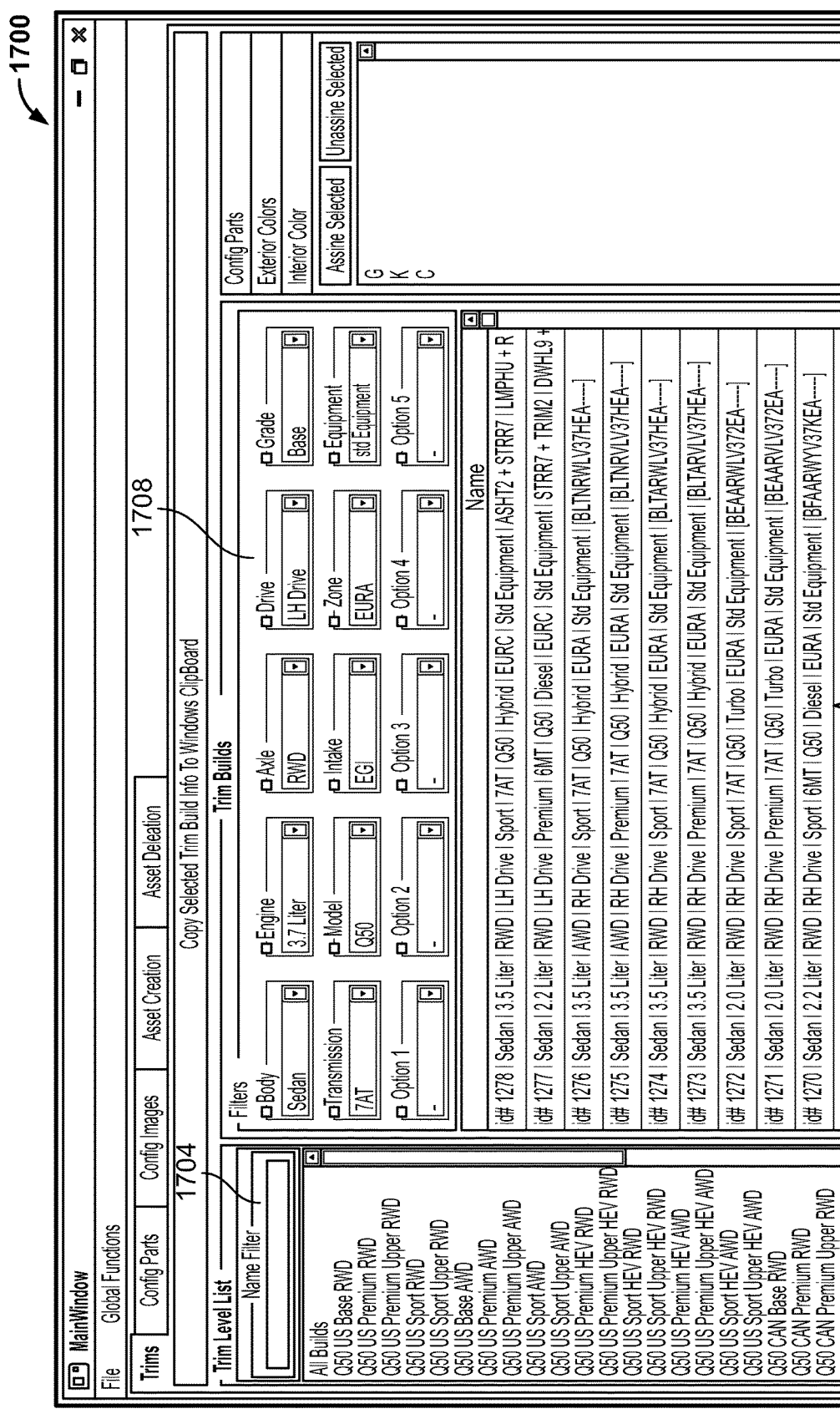
FIG. 17 is an example of a "trims" graphical user interface.

The "trims" module 910, see FIG. 9, provides the user with an overview of the various trim builds including the assigned named parts, colors and trims per build. An example of a "trims" graphical user interface 1700 is provided in FIG. 17. As shown, the interface 1700 includes a trim level list panel 1702 (trim level list is a list of all the EIMS available for a specific automobile), that provides a filtering option 1704. The interface 1700 further includes a trim builds panel 1706 that lists the various trim builds along with the option for filtering the trims builds via filter panel 1708. The filter panel 1708 includes a body filter, an engine filter, an axle filter, a drive filter, a grade filter, a transmission filter, a model filter, an intake filter, a zone filter, and equipment filter, and various option filters. The interface further includes a right panel 1710 that includes: a "config parts" option 1712 to provide a listing of the config images (see description of "config images" module 906 herein); an "exterior color" option 1714 where logic for applying an exterior automobile paint color to various parts can be added to/deleted from the database 350 through "assign" and "unassign" buttons 1716, 1718, respectively; and an "interior color option" 1722 where logic for applying interior automobile colors to various parts can be added to/deleted from the database 350 through "assign" and "unassign" buttons 1716, 1718, respectively.

The various modules described above (e.g., the "asset creation" module 902, the "asset deletion" module 904, the "config images" module 906, the "config parts" module 908, and the "trims" module 910), work in conjunction with each other in the configuration module 312 to establish a framework from which three-dimensional advertising images of a consumer product can be generated. The framework establishes instructions, via the "config images" module 906 (see also FIG. 12), that direct which of the named parts are to be selected and used to generate a specific three-dimensional advertising image and further comprises instructions that direct the assembly sequence of the selected named parts (e.g, defined stacking orders of the rendered two-dimensional images). The framework is configured to work in cooperation with the database 350 wherein the rendered, two-dimensional image format, final layers have been stored in a specific directory/sub-direction configuration as directed by the framework. In one example embodiment, the framework is converted to an XML, file that can be used by other programs. An example of a portion of such an XML file is illustrated in FIG. 18 where a specific automobile trim 1800 is identified, the options 1802 to be applied to the two-dimensional image layers that generate the image of the specific automobile trim are identified, and the actual two-dimensional image layers 1804 to generate the three-dimensional advertising image of the specific automobile trim are identified. In the format of an XML file, the framework can be imported into an image-editing program, e.g., Photoshop (or Affinity Photo, GIMP, Sketch, Pixelmator, Pixlr, Acorn, Corel Paintshop Pro, Paint.net, Sumopaint, etc.) along with the two-dimensional images to generate the three-dimensional advertising images with the XML file essentially operating as the recipe and the two-dimensional image layers as the ingredients. In certain examples, a Photoshop assembler tool is built using java script. The Photoshop assembler tool provides the options that are available in the XML file for the user to choose which configurations and which options they want built. The Photoshop assembler tool then builds the image based on the choices of the user.

In view of the above, the system and method of generating a consumer product advertising image provides an advertising client with a set of two-dimensional images and a framework (e.g., XML file as the configuration module) for generating a 360 degree three-dimensional advertising image of any and all possible options and trim builds of the automobile. Further, the set of two-dimensional images and framework use significantly less memory than would be required by three-dimensional images that represent all options and trims of an automobile. Moreover, the set of two-dimensional images and framework provide a fast-acting system enabling a user to select automobile options and to be presented with a corresponding image at almost a real-time speed.

Another example embodiment of the method 100 for generating a consumer product advertising image is configured to be implemented with the computing device 200 described above. For convenience of explanation and understanding, this method will be described with reference to a consumer product comprising a detergent bottle. However, it is to be understood that the method may be applied to any consumer product for which two-dimensional or three-dimensional digital drawings, e.g., CAD drawings, exist or may be created.

Figure 19:
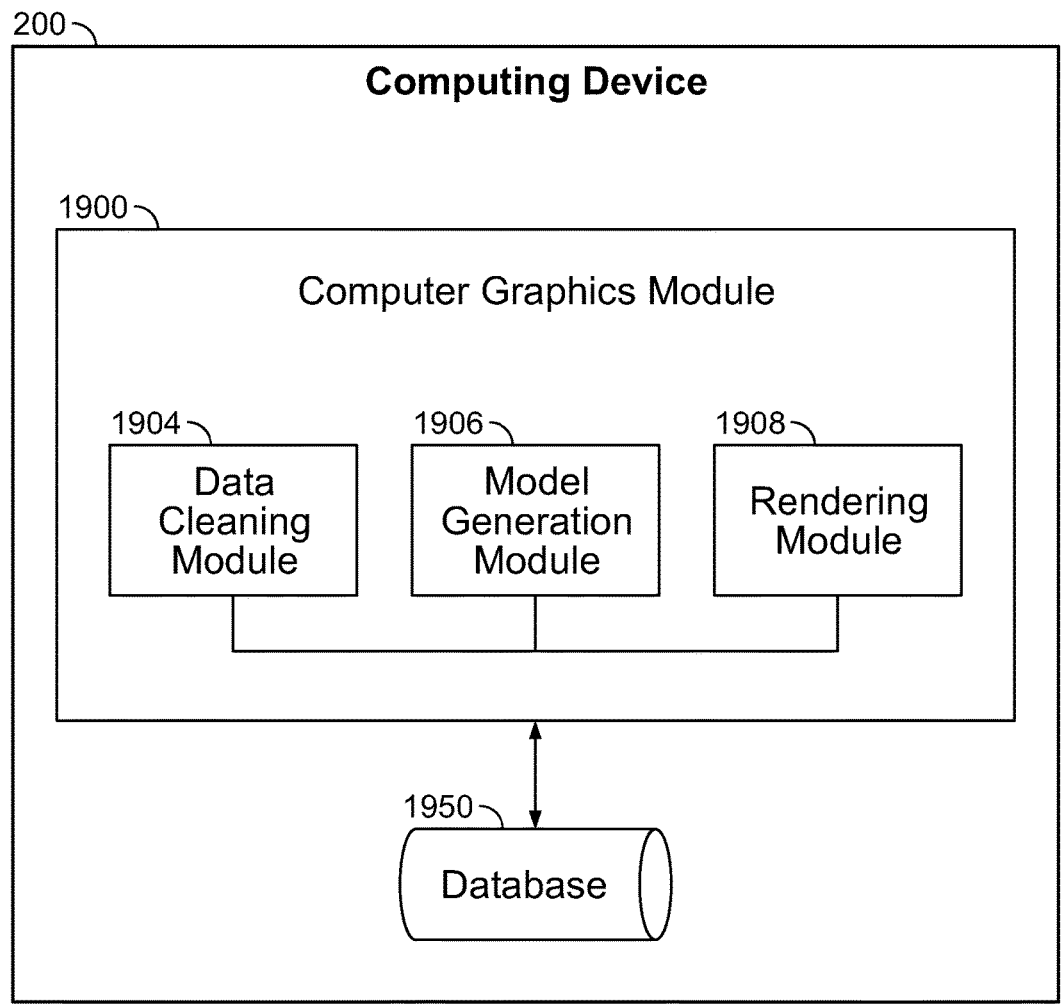
FIG. 19 is a schematic of the computing device and program modules that can be used to implement aspects of the present disclosure.

Referring to FIG. 19, in this embodiment the computing device 200 utilizes a database 1950 in combination with a computer graphics module 1900, which further includes a data cleaning module 1904, a model generation module 1906, and a rendering module 1908. The noted program modules are stored in memory and utilized by the computing device 200 to perform the various functions and operations for generating a consumer product advertising image in accordance with the flowchart of FIG. 20. In one example embodiment, the database 1950 comprises a Shotgun™ database available from Shotgun Software, however, other databases may be used. In another example embodiment, the computer graphics module comprises Autodesk Maya (or just "Maya") available from Autodesk Inc, however, other computer graphics programs may be used.

Figure 20:
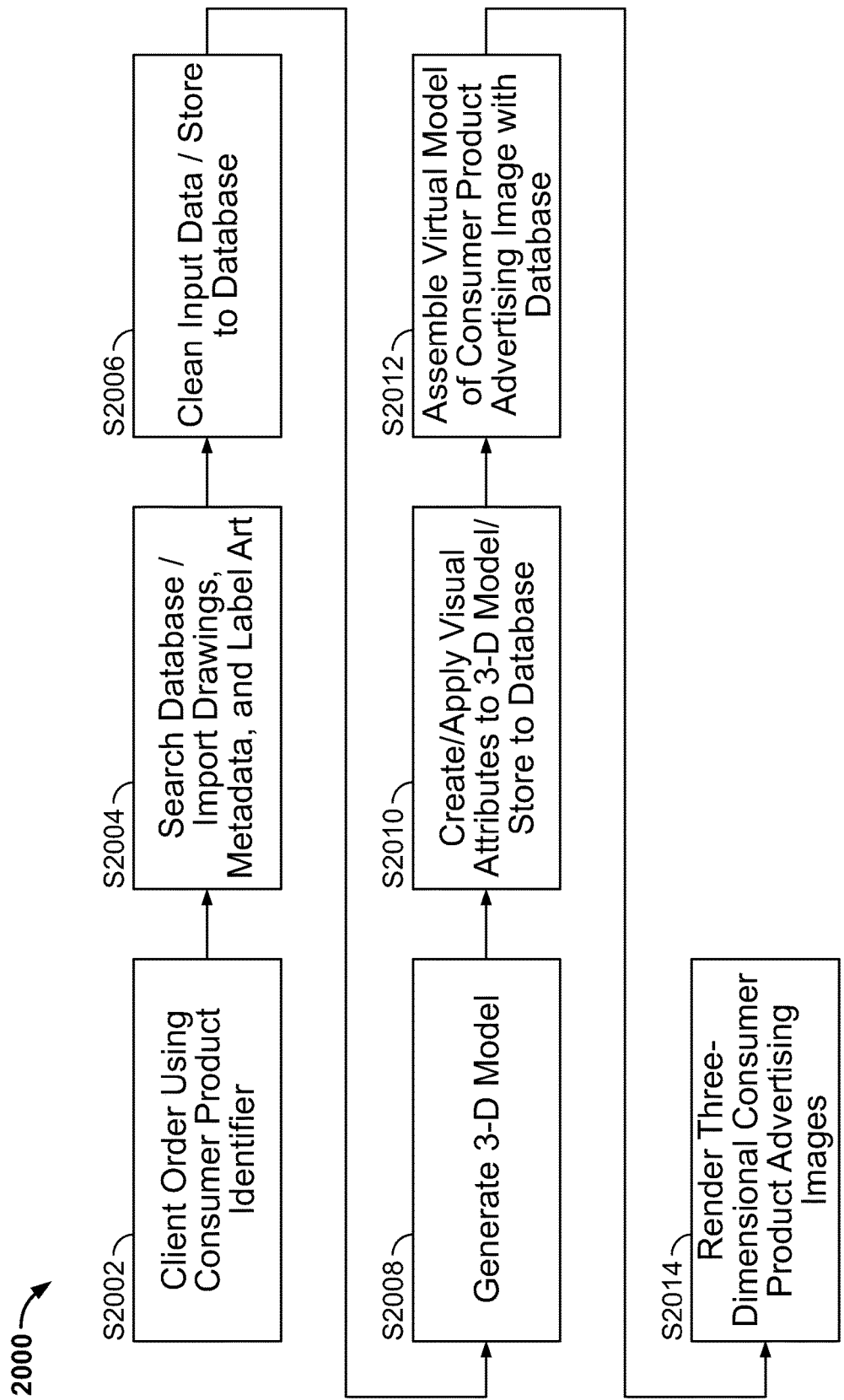
FIG. 20 is a flowchart of a method generating a consumer product advertising image.

Referring now to FIG. 20, wherein this embodiment of the method 100 is hereafter referred to as method 2000, a flowchart illustrates the method 2000 for generating a consumer product advertising image. As shown, the method 2000 begins with an order for one or more consumer product advertising images from a client S2002. The order is placed by the client by using a consumer product identifier such as a global trade item number (GTIN) or a universal product code (UPC). The consumer product identifier is entered into the database 1950 to determine if the consumer product identifier is linked to any existing CAD models of the consumer product and/or label art that is to be applied to the consumer product and, if so, the input data (e.g. digital drawings, metadata and label art) are imported from the database via the computer graphics module 1900, S2004. Note that the consumer product identifier may be linked to more than one CAD model and/or more than one option for label art. For example, in the instance of the detergent bottle, a CAD model may exist for the cap of the bottle, another for the spout of the bottle, and still another for the actual bottle itself while label art may exist for the front of the bottle and for the back of the bottle.

If the CAD models and/or label art for the consumer product are not present in the database 1950, the client is requested to supply the items and/or a digital model of the consumer product is made through traditional modeling techniques.

Continuing with the flowchart of FIG. 20, with the drawings, metadata, and label art imported into the computer graphics module 1900, the data cleaning module 1904 is employed to clean the input data and store the cleaned input data to the database 1950, S2006. The data cleaning module 1904 generally operates in accordance with the flowchart of FIG. 6 where the computer graphics module exports the three-dimensional objects within the input data to an Alembic cache, S602, where all history, modifiers, constraints, and connections are removed from the input data and the three-dimensional objects within the data are distilled into a non-procedural, application independent set of geometric results, S604. The geometric results are imported from the Alembic cache, S606 and re-associated with original layers, hierarchy and shaders of the input data, S608. In using the above-described process, the data cleaning module 1904 enables the removal of any connections, attributes, or irregular settings that may have been previously set within the starting geometry and ensures that the cleaned model of the consumer product can accept the designated label art.

Returning now to the flowchart of FIG. 21, the cleaned and re-associated input data is used by the model generation module 1906 to generate a three-dimensional model of the consumer product, S2008. Subsequently, visual attributes are created and applied to the three-dimensional model; the visual attributes are stored to the database in relation to the consumer product identifier, S2010. The visual attributes may comprise, but are not limited to, texture, color, lens effects and camera angles, lighting, etc.

With all elements (e.g., digital drawings for three-dimensional virtual model of consumer product, visual attributes for the virtual model, and label art for the virtual model), having been established for generating a virtual model of a desired consumer product advertising image, the two-dimensional image layers can be assembled, or stacked, in the appropriate order, S2010 (e.g. such as by using the configuration module 312 to define a stacking order of two-dimensional images) and provided to the rendering module 1908 of the computer graphics module 1900 to render, S2014, the desired two-dimensional consumer product advertising images, or sequence of images, that may be provided for use by the client.

As before, the two-dimensional images and defined stacking orders can be imported into an image-editing program, such as Photoshop or similar program, to generate a three-dimensional.

For any consumer product, the ability to generate three-dimensional images from two-dimensional images and a framework (e.g., stacking orders), as opposed to simply providing three-dimensional images, provides the benefits of reduced memory usage (three-dimensional images taking significantly more space than two-dimensional images) and faster image production (three-dimensional images take longer to load than two-dimensional images). Accordingly, three-dimensional images can be created from two-dimensional images in what essentially amounts to real-time, or on-the-fly image creation. Furthermore, each three-dimensional consumer product image produced through use of the two-dimensional images and framework is substantially equivalent to a physically capture photograph of the consumer product, and a sequence three-dimensional images produced through use of the two-dimensional images and framework is substantially equivalent to a physically captured film of the consumer product.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method comprising:
   distilling one or more objects of a three-dimensional model of a consumer product to corresponding three-dimensional geometric representations of the one or more objects;
   applying a visual attribute to the one or more three-dimensional geometric representations of the objects;
   rendering a plurality of two dimensional images from the three-dimensional geometric representations of the objects with applied visual attributes;
   defining one or more stacking orders of at least a portion of the plurality of two dimensional images; and
   delivering to a user the two-dimensional images and the defined stacking orders in a form that is importable into a computer-executable image editing program, the computer-executable image editing program capable of enabling user selection of one or more of the defined stacking orders and capable of producing a three-dimensional image of at least a portion of the consumer product based on the user-selected one or more defined stacking orders and the imported two-dimensional images.

2. The method of claim 1, further comprising applying original layer assignment, original layer hierarchy and original shading associated with the three-dimensional model of the consumer product to the one or more three-dimensional geometric representations of the objects.

3. The method of claim 1, wherein each produced three-dimensional image of the consumer product is substantially equivalent to a physically captured photograph of the consumer product.

4. The method of claim 1, wherein a sequence of produced three-dimensional images of the consumer product is substantially equivalent to a physically captured film of the consumer product.

5. The method of claim 1, wherein the defined stacking orders are in the form of an XML file.

6. The method of claim 1, wherein the visual attribute comprises lighting, a color, a texture, a camera angle, and/or a lens effect.

7. The method of claim 1, wherein the computer-executable image editing program comprises Photoshop or a Photoshop equivalent.

8. The method of claim 1, wherein the step of distilling, applying and rendering are performed by a computer-executable computer graphics program.

9. The method of claim 8, wherein the computer-executable computer graphics program comprises Maya or a Maya equivalent.

10. A method comprising:
    distilling one or more objects of a three-dimensional model of a consumer product to corresponding three-dimensional geometric representations of the one or more objects;
    applying original layer assignment, original layer hierarchy and original shading associated with the three-dimensional model of the consumer product to the one or more three-dimensional geometric representations of the objects;
    rendering a first plurality of two-dimensional images based on the three-dimensional geometric representations of the one or more objects with original layer assignment, hierarchy and shading;
    applying a visual attribute to the first plurality of two-dimensional images;
    rendering a second plurality of two dimensional images from the first plurality of two dimensional images with applied visual attributes;
    defining one or more stacking orders of at least a portion of the second plurality of two dimensional images; and
    delivering to a user the second plurality of two-dimensional images and the defined stacking orders in a form that is importable into a computer-executable image editing program, the computer-executable image editing program capable of enabling user selection of one or more of the defined stacking orders and capable of producing a three-dimensional image of at least a portion of the consumer product based on the user-selected one or more defined stacking orders and the imported two-dimensional images.

11. The method of claim 10, wherein each produced three-dimensional image of the consumer product is substantially equivalent to a physically captured photograph of the consumer product.

12. The method of claim 10, wherein a sequence of produced three-dimensional images of the consumer product is substantially equivalent to physically captured film of the consumer product.

13. The method of claim 10, wherein the defined stacking orders are in the form of an XML file.

14. The method of claim 10, wherein the visual attribute comprises lighting, a color, a texture, a camera angle, and/or a lens effect.

15. The method of claim 10, wherein the computer-executable image editing program comprises Photoshop or a Photoshop equivalent.

16. The method of claim 10, wherein the steps of distilling, applying and rendering are performed by a computer-executable computer graphics program.

17. The method of claim 10, wherein the computer-executable computer graphics program comprises Maya or a Maya equivalent.

18. A system comprising:
a computing device comprising:
a processing device; and
a computer readable storage device storing data instructions that when executed by the processing device cause the computing device to:
 distill one or more objects of a three-dimensional model of a consumer product to corresponding three-dimensional geometric representations of the one or more objects;
 apply a visual attribute to the one or more three-dimensional geometric representations of the objects;
 render a plurality of two dimensional images from the three-dimensional geometric representations of the objects with applied visual attributes; and
 define one or more stacking orders of at least a portion of the plurality of two dimensional images; and
 wherein the rendered two-dimensional images and the defined one or more stacking orders are rendered and defined, respectively, in a form that is importable into a computer-executable image editing program.

19. The system of claim 18, wherein the computer-executable image editing program is capable of enabling user selection of one or more of the defined stacking orders and capable of producing a three-dimensional image of at least a portion of the consumer product based on the user-selected one or more defined stacking orders and the imported two-dimensional images.

20. The system of claim 19, wherein each produced three-dimensional image of the consumer product is substantially equivalent to a physically captured photograph of the consumer product.

21. The method of claim 19, wherein a sequence of produced three-dimensional images of the consumer product is substantially equivalent to a physically captured film of the consumer product.

* * * * *